( 12 ) United States Patent
Das

(10) Patent No.: US 8,095,599 B2
(45) Date of Patent: Jan. 10, 2012

(54) MAIL-BASED WEB APPLICATION AND DOCUMENT DELIVERY

(75) Inventor: Pranab Das, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1259 days.

(21) Appl. No.: 11/254,654

(22) Filed: Oct. 20, 2005

(65) Prior Publication Data

US 2007/0094414 A1    Apr. 26, 2007

(51) Int. Cl.
*G06F 15/16* (2006.01)
(52) U.S. Cl. .................. 709/206; 709/227; 709/229
(58) Field of Classification Search .............. 709/206, 709/227, 229
See application file for complete search history.

(56) References Cited

U.S. PATENT DOCUMENTS

| | | | |
|---|---|---|---|
| 6,068,661 A * | 5/2000 | Shari ............................... | 703/27 |
| 6,336,135 B1 * | 1/2002 | Niblett et al. ................. | 709/215 |
| 6,345,315 B1 | 2/2002 | Mishra | |
| 6,594,693 B1 | 7/2003 | Borwankar | |
| 6,615,234 B1 | 9/2003 | Adamske et al. | |
| 6,633,914 B1 * | 10/2003 | Bayeh et al. ................. | 709/227 |
| 6,694,482 B1 | 2/2004 | Arellano et al. | |
| 6,718,515 B1 * | 4/2004 | Conner et al. ................ | 715/207 |
| 2001/0047358 A1 | 11/2001 | Flinn et al. | |
| 2002/0178271 A1 | 11/2002 | Graham et al. | |
| 2002/0194307 A1 * | 12/2002 | Anderson et al. ............. | 709/219 |
| 2003/0110236 A1 | 6/2003 | Yang et al. | |
| 2003/0233437 A1 | 12/2003 | Kitada et al. | |
| 2004/0044799 A1 | 3/2004 | Sivaraman et al. | |
| 2006/0200522 A1 * | 9/2006 | Guest ............................ | 709/206 |

* cited by examiner

*Primary Examiner* — Karen Tang
(74) *Attorney, Agent, or Firm* — Schmeiser, Olsen & Watts; John Pivnichny

(57) ABSTRACT

A method and system for synchronously transferring information across the Internet. A user transmits a first message to a MAILS client. The MAILS client synchronously transmits the first message across the Internet by electronic mail to a MAILS server. The MAILS server synchronously transmits the first message to a software application residing on an application server. The software application may synchronously transmit a second message to the MAILS server in response to the first message. The MAILS server may synchronously transmit the second message across the Internet by electronic mail to the MAILS client. The MAILS client may transmit the second message to the user.

34 Claims, 21 Drawing Sheets

A Web Application Topology

Sample Student Registration Scenario

Processing MAILS-User-Message at MAILS Server

Sending MAILS-User-Response to MAILS Client

MAILS Protocol Stack on TCP/IP

Timing of Connections Between MAILS Client and MAILS Server

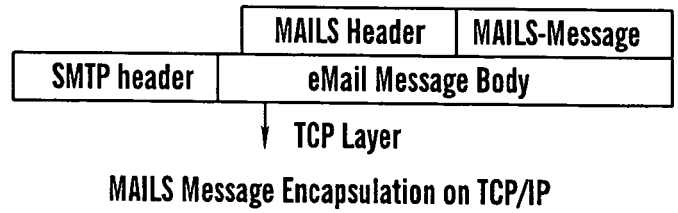

MAILS Message Encapsulation on TCP/IP

FIG. 16

```
<?xml version="1.0" encoding="UTF-8"?>
<MAILS xmlns:xsi="http://www.w3.org/2001/XMLSchema-instance" xsi:noNamespaceSchemaLocation =
        "C:\\smtp\mails2.xsd">
    <MAILS-Headers>
        <Header Id="1">67348</Header>   <!--Where Id=1 stands for client port.-->
        <Header Id="2">0</Header>       <!--Where Id=2 stands for server port. -->
        <Header Id="5">""</Header>      <!--Where Id=5 stands for some custom headers.-->
    </MAILS-Headers>
    <Mail-Headers>
        <Header Id="3">client@email.id</Header>   <!--Where id=3 stands for client email (one of
            the "To" or "From" fields, as appropriate.-->
        <Header Id="4">""</Header>      <!--Where id=4 stands for server email.-->
    </Mail-Headers>
    <MessageContents>

</ MessageContents>
</MAILS>
```

MAILS-Header

FIG. 17

```xml
<?xml version="1.0" encoding="UTF-8"?>
<!-- edited with XMLSPY v2004 rel. 4 U (http://www.xmlspy.com) by Pranab Das (Home) -->
<xs:schema elementFormDefault="qualified" attributeFormDefault="unqualified" xmlns:xs="http://www.w3.org/2001/XMLSchema">
    <xs:element name="MAILS">
        <xs:annotation>
            <xs:documentation>Mails message body</xs:documentation>
        </xs:annotation>
        <xs:complexType>
            <xs:sequence>
                <xs:element name="MAILS-Headers">
                    <xs:complexType>
                        <xs:sequence>
                            <xs:element ref="Header" maxOccurs="unbounded"/>
                        </xs:sequence>
                    </xs:complexType>
                </xs:element>
                <xs:element name="HTTP-Headers" minOccurs="0">
                    <xs:annotation>
                        <xs:documentation>These would follow HTTP
                            specifications to the extent
                            applicable.</xs:documentation>
                    </xs:annotation>
                    <xs:complexType>
                        <xs:sequence>
                            <xs:element ref="Header"
                                maxOccurs="unbounded"/>
                        </xs:sequence>
                    </xs:complexType>
                </xs:element>
                <xs:element name="Mail-Headers">
                    <xs:annotation>
                        <xs:documentation>These headers relate to various
                            mail protocols</xs:documentation>
                    </xs:annotation>
```

XML Schema For MAILS (Part 1)

FIG. 23A

```xml
            <xs:complexType>
                <xs:sequence>
                    <xs:element ref="Header"/>
                </xs:sequence>
            </xs:complexType>
        </xs:element>
        <xs:element name="MessageContents"/>
    </xs:sequence>
</xs:complexType>
</xs:element>    <xs:element name="Header">
    <xs:annotation>
        <xs:documentation>Static part of headers would be stored with both
                the client and the server; only the header id
                and dynamic part need be
                communicated.</xs:documentation>
    </xs:annotation>
    <xs:complexType>
        <xs:attribute name="Kind" use="required">
            <xs:simpleType>
                <xs:restriction base="xs:string">
                    <xs:enumeration value="Entity"/>
                    <xs:enumeration value="General"/>
                    <xs:enumeration value="Request"/>
                    <xs:enumeration value="Response"/>
                </xs:restriction>
            </xs:simpleType>
        </xs:attribute>
        <xs:attribute ref="Id"/>
    </xs:complexType>
</xs:element>
<xs:attribute name="Id" type="xs:int"/>
</xs:schema>
```

XML Schema For MAILS (Part 2)

FIG. 23B

MAIL-BASED WEB APPLICATION AND DOCUMENT DELIVERY

BACKGROUND OF THE INVENTION

1. Technical Field

The present invention relates to a method and system for implementing mail-based application and document delivery.

2. Related Art

The Internet requires a number of protocols to complement each other. The protocols form a bidirectional value chain, wherein each layer of the value chain obtains service from the layer below or above while providing service to the layer above or below, depending on the direction of flow of service. The division of protocols among the layers is more related to the working group's philosophy of division of work, concern over loss of data, etc; otherwise they perform essentially the same function, which is to deliver generally error-free data across the network. Popularly used suites of networking protocols, e.g., Transmission Control Protocol/Internet Protocol (TCP/IP) or Open System Interconnect (OSI), describe the topmost layer as the application layer. Various business applications are deployed on top of the application layer. Most prominent among the application layer protocols is Hyper-Text Transfer Protocol (HTTP), which is the de facto standard for carrying most of the document and application delivery in the Internet. The application layer protocol, HTTP, sometimes mimics a transport layer protocol (which is the layer immediately below the application layer) in order to transport HTTP-encoded data pertaining to business applications, which behavior of HTTP is referred to as tunneling. Wihle HTTP, with or without tunneling, has monopolized the Internet, any failure on part of HTTP will leave the world of distributed computing hapless.

Thus, there is a need for a method and system to mitigate the effect of a HTTP failure.

SUMMARY OF THE INVENTION

The present invention provides a method for synchronously transferring information across the Internet, comprising: receiving a first message by a MAILS client from a user; and transmitting the first message synchronously across the Internet by electronic mail from the MAILS client to a MAILS server, said MAILS server adapted to synchronously transmit the first message to a software application residing on an application server.

The present invention provides a computer program product, comprising a computer usable medium having a computer readable program code embodied therein, said computer readable program code comprising an algorithm adapted to implement a method for synchronously transferring information across the Internet, said method comprising: receiving a first message by a MAILS client from a user; and transmitting the first message synchronously across the Internet by electronic mail from the MAILS client to a MAILS server, said MAILS server adapted to synchronously transmit the first message to a software application residing on an application server.

The present invention provides a system for synchronously transferring information across the Internet, comprising: means for receiving a first request message by a MAILS client from a user; and means for transmitting the first message synchronously across the Internet by electronic mail from the MAILS client to a MAILS server, said MAILS server adapted to synchronously transmit the first message to a software application residing on an application server.

The present invention provides a method for synchronously transferring information across the Internet, comprising: receiving by a MAILS server a first message synchronously transmitted across the Internet by electronic mail from a MAILS client, said first message having been previously received by the MAILS client from a user; and transmitting the first message synchronously from the MAILS server to a software application residing on an application server.

The present invention provides a computer program product, comprising a computer usable medium having a computer readable program code embodied therein, said computer readable program code comprising an algorithm adapted to implement a method for synchronously transferring information across the Internet, said method comprising: receiving by a MAILS server a first message synchronously transmitted across the Internet by electronic mail from a MAILS client, said first message having been previously received by the MAILS client from a user; and transmitting the first message synchronously from the MAILS server to a software application residing on an application server.

The present invention provides a system for synchronously transferring information across the Internet, comprising: means for receiving by a MAILS server a first message synchronously transmitted across the Internet by electronic mail from a MAILS client, said first message having been previously received by the MAILS client from a user; and means for transmitting the first message synchronously from the MAILS server to a software application residing on an application server.

The present invention advantageously provides a method and system to mitigate the effect of a HTTP failure.

BRIEF DESCRIPTION OF THE DRAWINGS

FIG. 16 illustrates MAILS message encapsulation, in accordance with embodiments of the present invention.

FIG. 17 depicts a MAILS-Header having an illustrative format, in accordance with embodiments of the present invention.

FIGS. 23A and 23B illustrate Extensible Markup Language (XML) schema for MAILS, in accordance with embodiments of the present invention.

DETAILED DESCRIPTION OF THE INVENTION

Figure 1:
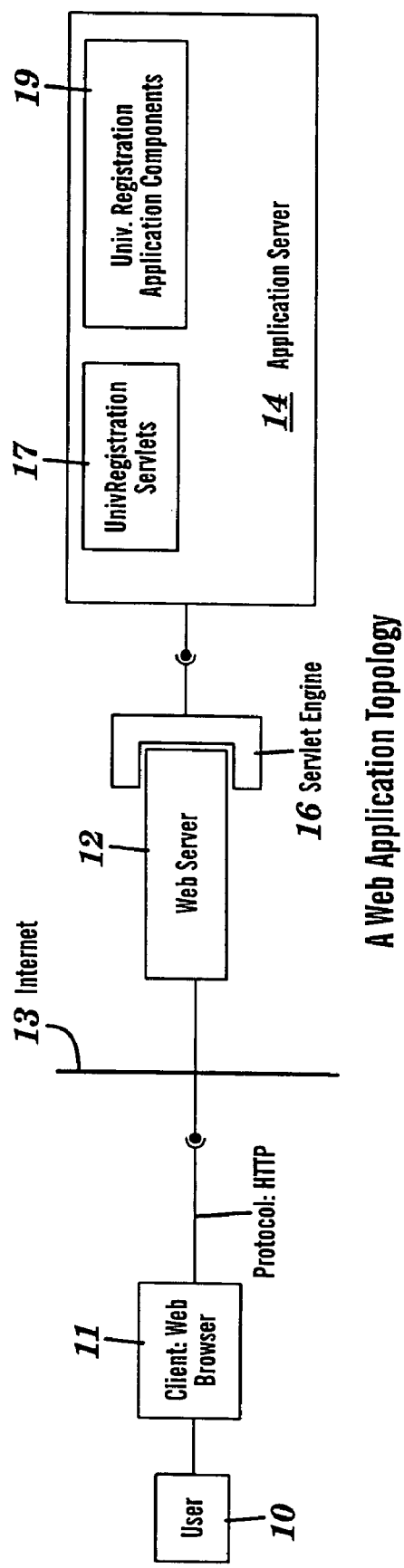
FIG. 1 illustrates a Web application topology using Hyper-Text Transfer Protocol (HTTP) as an application layer protocol, in accordance with embodiments of the present invention.

FIG. 1 illustrates a Web application topology using HyperText Transfer Protocol (HTTP), which is an application layer protocol but is also used for encoding and transporting data related to business applications, and which is being depicted in accordance with embodiments of the present invention. A Web-based business application, aka. Web application, is a software application that is accessed by an end-user connected to the Web application through the Internet. The HyperText Transfer Protocol (HTTP) sometimes acts as a transport protocol (tunneling) that couples the end-user to the Web application. The illustrative Web application in FIG. 1 called 'University Registration', will be used by candidate-students to submit registration forms to the University online via the Internet.

The illustrative Web application is implemented on a Java 2 Platform, Standard and Enterprise Editions (J2SE and J2EE), a programming platform for developing and running distributed applications having modular components running on an application server. As per vogue Hypertext Markup Language (HTML) was used (with forms) for presentation, servlets/JavaServer Pages (JSP) were used for controllers, and Enterprise JavaBeans® (EJB) to implement the University Registration application components. The choice of Java (e.g., servlet, EJB, etc.) as the underlying technology to implement University Registration application components is merely illustrative and the scope of the present invention includes any other Web-application technology.

In FIG. 1, a user 10 (e.g., a student) employs a Web browser client 11 in a personal computer or workstation to request information (e.g., a service) from the Web application, University Registration, via Univ. Registration Application Components 19 (EJB components) located within an application server 14 (e.g., an IBM WebSphere® application server). The use of the Univ. Registration Application Components 19 is for illustrative purposes only, and the scope of the present application applies to any Web application. The application server 14 deploys UnivRegistration Servlets 17, which are responsible for generating dynamic HTML content by referring to the information maintained by University Registration Application Components 19. The Registration Application Components 19 are also responsible for managing business data that support the business logic.

The request by the user 10 is sent by the Web browser client 11 over the Internet 13 as a HTTP-request message, which includes a Uniform Resource Locator (URL) to the UnivRegistration Servlets 17. This request is redirected by the Web server 12 to the application server 14 in accordance with the URL. The servlet engine 16 attached to the Web server 12 receives this request and passes the request to one of the UnivRegistration Servlets 17 with the session information and the request object. The UnivRegistration Servers 17 implement the control logic, which may necessitate access to the Univ. Registration Application Components 19. The UnivRegistration Servlet 17 is responsible for preparing a response (with HTML content) to the request, which will be sent back to the Web browser 11 over the Internet 13.

In summary, in the operational model for the run-time architecture of FIG. 1, the Web Server 12 is capable of serving static HTML pages only, when requested by the user 10 via the Web browser 11 that will render the HTML pages. If the requested URL does not point to a static Web page but to a dynamic resource, such as a University Registration Servlet 17, the servlet engine 16 will invoke the appropriate servlet and the later, in turn, will invoke an University Registration Application component 19, deployed with the application server 14, while Univ. Registration Application Components 19 will serve dynamic content of the HTML form of 17 to complete a Web form, when the user requests a service, a document, information, etc. from the Univ. Registration Application Components 19.

In the illustrative Web application of FIG. 1, HTTP is being used as a transport (tunneling) mechanism for the client Web browser 11 to access the back-end application, namely Registration Application Components 19. A scenario may occur, however, in which the Web server 12 is not available. For example, a hacker may succeed in breaking the universal protocol of HTTP to a point when use of HTTP might become unsafe.

The present invention provides an alternative transport mechanism aka protocol-level redundancy, utilizing electronic mail (email) that could be used by the user 10 for interacting with the Registration Application Components 19 if the Web server 12 should become unavailable. The world of email has evolved from simple text-based information exchange to richer HTML-based information exchange. Currently, email servers allow users to define agents (which are reactive software components that respond to predefined actions, such as OnReceiving Mail), that can be used for automating classification of incoming mails, send automated response mail to the sender, etc.

While HTTP-based communication between the sender and the receiver is synchronous, ordinary email-based communication between the sender and the receiver is asynchronous. Synchronous communication comprises a session that may include not only a request or a response, as with asynchronous communication, but at least a request and a response (or even a series of requests and responses) until the logical purpose of communicating comes to an end, which is also called "blocking" such that a synchronous call blocks a session until a communication has been logically completed. The present invention extends the current email environment by providing a new protocol, referred to as MAILS protocol, to interact with the Registration Application Components 19 in a synchronous manner. The MAILS protocol provides an extension to an existing asynchronous e-Mail protocol (e.g., Simple Mail Transfer Protocol (SMTP)), with or without facilitating protocols (e.g., Post Office Protocol (POP), Internet Message Access Protocol (IMAP), etc.), to enable synchronous communication between the sender and the receiver as with HTTP. Note that the MAILS protocol may be built on top of any one of the networking protocol suites such as, inter alia, Transmission Control Protocol/Internet Protocol (TCP/IP), Internet Packet Exchange/Sequenced Packet Exchange (IPX/SPX), Systems Network Architecture (SNA) protocol, Digital Equipment Corporation network (DECnet) protocol, etc., provided they already have a asynchronous protocol (e.g. SMTP or the like) implemented. Similarly, the protocol tunneled is not restricted to HTML, XML, or Servlets, which are taken as examples only and can be as different as Simple Network Monitoring Protocol (SNMP), with appropriate handlers on either side (replacing the "Plugin for Servlet" on the server side and "MAILS-enabled SNMP browser or application" as Client 21 in FIG. 2), which, for example, may allow one to monitor or control a network remotely.

MAILS is an application layer protocol that overcomes limitations of existing mail protocols (e.g., SMTP). As stated supra, mail protocols were not designed for synchronous (session blocking) interaction between the sender and receiver as with HTTP. Through augmenting certain features to existing mail protocols, MAILS performs similarly to HTTP in extending to sessions. With the MAILS application layer protocol, the user 10 would use an extended client application (referred to as MAILS-enabled client) to synchronously interact with the back-end application (e.g., Registration Application Components 19) through a MAILS server which functions like a Web or HTTP server for the HTTP protocol.

Figure 2:
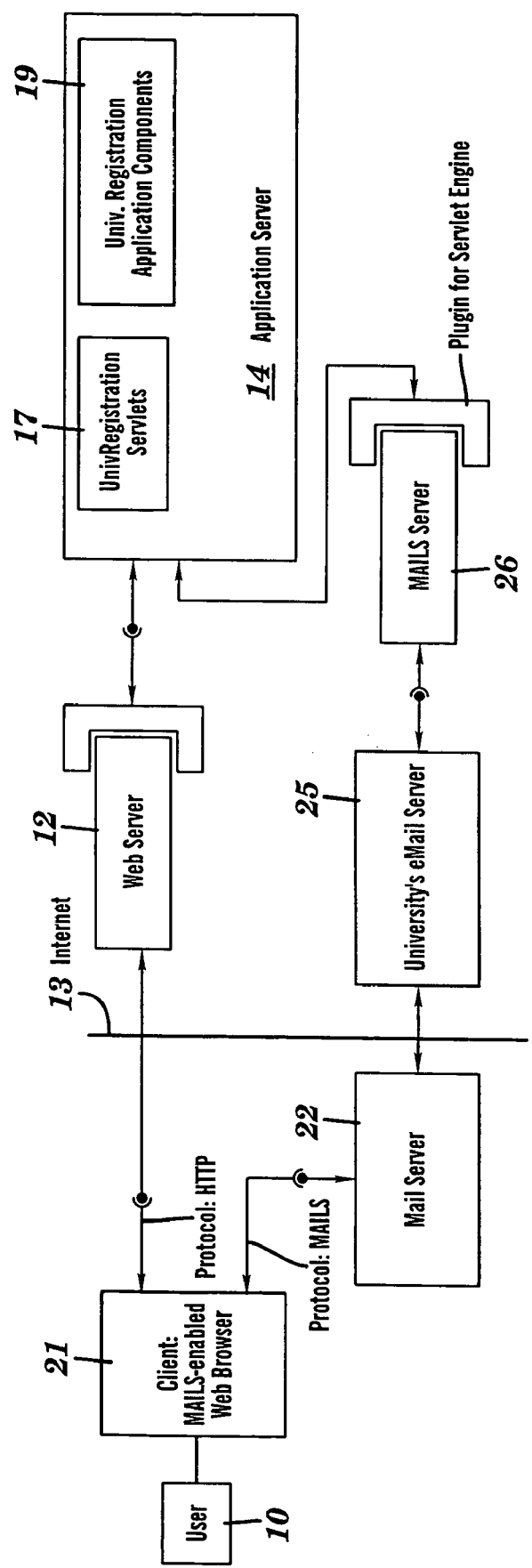
FIG. 2 illustrates a Web application topology using a MAILS application layer protocol involving a MAILS-enabled client and a MAILS server, in accordance with embodiments of the present invention.

FIG. 2 illustrates a Web application topology using a MAILS application layer protocol involving a MAILS-enabled client 21 and a MAILS server 26, in accordance with embodiments of the present invention. The user 10 may utilize the HTTP application layer protocol with the (MAILS-enabled) Web browser 21 and Web (HTTP) server 12 when the HTTP server 12 is operational. The user 10 may utilize the MAIL application layer protocol with the MAILS-enabled client 21 and the MAILS server 26 when the HTTP server 12 is not operational. Alternatively, the user 10 may utilize the MAIL application layer protocol with the MAILS-enabled client 21 and the MAILS server 26 even when the HTTP server 12 is operational.

With respect to use of the MAILS application layer protocol, the user 10 employs the MAILS-based client 21 to initiate submission of the request, or a modification thereof, of the user 10 to the Registration Application Components 19 via a MAILS server 26.

Figure 14:
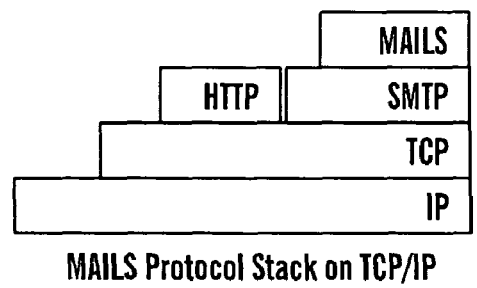
FIG. 14 depicts a MAILS protocol stack, in accordance with embodiments of the present invention.

The MAILS-based client 21 is coupled to the user's mail server 22 via a MAILS protocol stack described infra in conjunction with FIG. 14. The user's mail server 22 comprises the user's mailbox and uses an asynchronous email protocol (e.g., SMTP). A MAILS protocol in the MAILS protocol stack for the MAILS client 21 is a synchronous wrapper to the asynchronous email protocol used by the user's mail server 22, to enable the MAILS client 21 to respond synchronously to incoming mail.

The MAILS Server 26 is coupled to the University's email server 25 via the MAILS protocol stack described infra in conjunction with FIG. 14. The University's email server 25 uses an asynchronous email protocol (e.g., SMTP). The MAILS Server 26 can access mails from the University's email server 25 in a number of ways. For example, the MAILS Server 26 may monitor the mail (e.g. SMTP) port of the University's email server 25, thus accessing all mails to the University email Server 25, where the University email Server 25 is dedicated to the application. As another example, the MAILS Server 26 may monitor a mailbox in the University's email server 25 only dedicated to the application. As yet another example, the MAILS Server 26 may collect mails from a dedicated mailbox in the University's email server 25 to its own storage and monitor such mails from there. It may be noted that the user 10, has all these choices but normally only (2) or (3) are expected, while (2) is assumed in the embodiment. However, if user 10 is another application, it may, as well use any of the alternatives. A MAILS protocol in the MAILS protocol stack for the MAILS Server 26 is a synchronous wrapper to the asynchronous email protocol used by the University's email server 25, to enable the MAILS Server 26 to respond synchronously to incoming mail.

The MAILS-based client 21 processes the message received from the user 10 to generate a processed message. The MAILS-based client 21 sends the processed message synchronously as electronic mail across the Internet 13 to the MAILS server 26 in conjunction with the University's email server 25. The MAILS server 26 sends the processed message synchronously to the application server 14. After receiving the request processed by the application server 14, the Registration Application Components 19 generates a response to the received message and sends the response synchronously via the application server 14 to the MAILS server 26. The MAILS server 26 transmits the response synchronously as electronic mail across the Internet 13 to the MAILS client 21 in conjunction with the client's mail server 22. The MAILS client 21 then sends the response to the user 10. Thus, the present invention utilizes eMAIL in a novel manner to effectuate synchronous communication between the user 10 and the Registration Application Components 19.

FIGS. 3-13 describe the MAILS Web application topology of FIG. 2 in detail, in accordance with embodiments of the present invention. In FIGS. 3-13, the block representation of

denotes a block that is described in more detail in another Figure.

Figure 3:
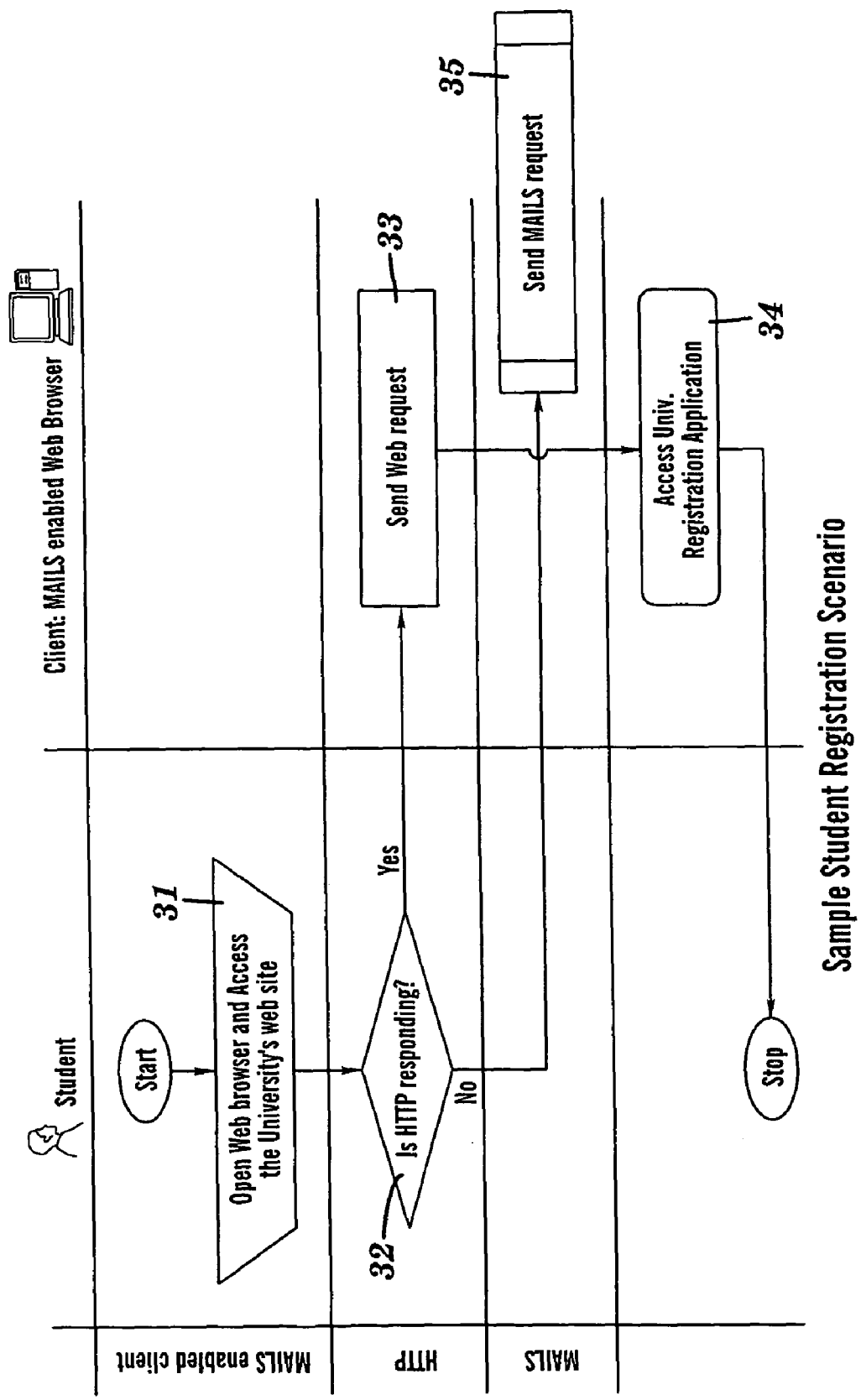
FIG. 3 is a flow chart of a sample student registration scenario relating to use of the Web application topology of FIG. 2, in accordance with embodiments of the present invention.

FIG. 3 is a flow chart of a sample student registration scenario relating to use of the Web application topology of FIG. 2 as depicted in steps 31-35, in accordance with embodiments of the present invention. In step 31, the user 10 opens the (MAILS-enabled) Web browser 21 in an attempt to access the University' Web site to which the application server 14 is coupled, as identified by the URL of the University's Web site. Step 32 determines whether the URL of the University's Web site is responding (i.e., if the University' Web site is accessible). If step 32 determines that the URL of the University's Web site is responding, then step 33 sends the request to the to the University's Web site for subsequent processing by the Registration Application Components 19 of the application server 14 in step 34. If step 32 determines that the URL of the University's Web site is not responding, then in step 35 the MAILS-enabled client 21 processes the user's request (i.e., a registration form) and sends the request to the MAILS server 26 as described supra in conjunction with FIG. 2. Step 35 is described infra in greater detail in FIG. 4.

FIGS. 4-9 describe processes performed by the MAILS-enabled client 21 of FIG. 2, in accordance with embodiments of the present invention.

Figure 4:
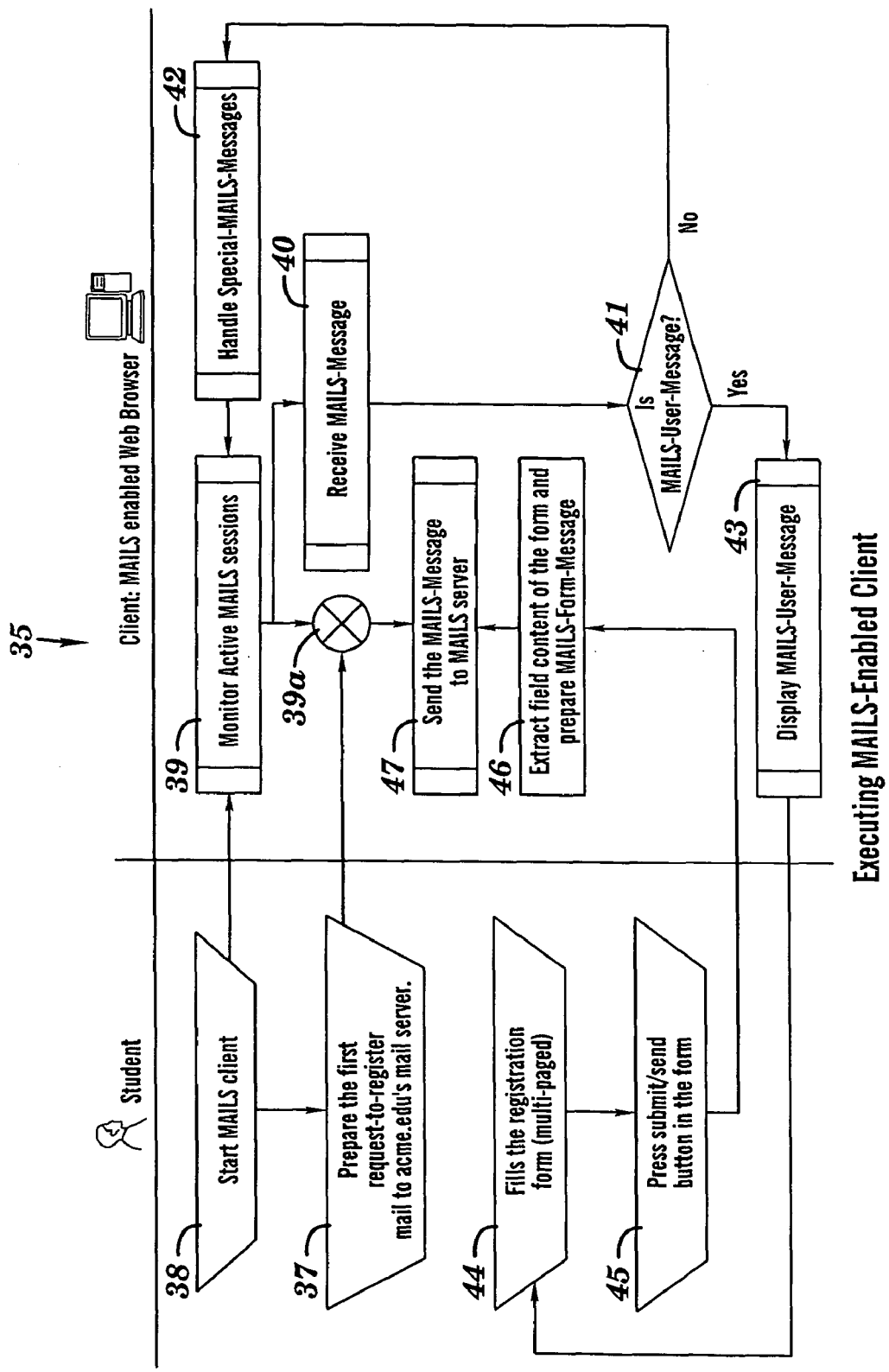
FIGS. 4-9 describe processes performed by the MAILS-enabled client of FIG. 2, in accordance with embodiments of the present invention.

FIG. 4 is a flowchart for implementing step 35 of FIG. 3 by execution of the MAILS-enabled client 21, for processing the user's request (i.e., a registration form) and sends the request to the MAILS server 26 as depicted in steps 37-48, in accordance with embodiments of the present invention.

Step 37 is executed only for the first request to register mail at the MAILS server 26, for mail sent from the MAILS-enabled client 21. For example, in step 37 the student (representing the user 10 of FIG. 2) may send a mail to email address "register@acme.edu" with specific keywords (e.g., "Register") in the subject line of the eMAIL for initialization purposes, if it is uncertain whether MAILS server is available at the other end; or the student might also enter "mails:// register.acme.edu" in the space for entering URL address with the MAILS-enabled client 21 if the student knows the destination URL address. Following step 37 and after monitoring of active mail sessions 39 has successfully started, step 47 sends the message to the MAILS server 26. The symbol 39a stands for logical AND to combine the prerequisites. If step 37 is executed, then steps 41-47 are also executed to properly prepare the user's message for transmission to the MAILS server 26. In other words, step 37 is an extra step that supplements steps 41-47 for the processing of the message by the MAILS-enabled client 21.

Step 38 initiates execution of the MAILS-enabled client 21. Step 39 monitors active MAILS sessions by determining whether a new MAILS session has been initiated; i.e. if MAILS can handle requests from the user 10 or corresponding responses from the backend application, such as Univ. Registration Application Components 19, (e.g., against request from the user 10) arriving in the form of emails at the user's mailbox within mail server 22 in the context of a single session (see FIG. 2). A MAILS session is a session implemented in accordance with the MAILS protocol. Step 39 is described in greater detail in FIG. 5.

When step 39 determines that new MAILS session has been initiated, step 40 receives the MAILS responding message for the user 10. Step 40 is described in greater detail in FIG. 7.

A MAILS message is a message that is to be processed in accordance with the MAILS protocol. A MAILS message may be a MAILS-User-Message or a Special-MAILS-message. For example, a MAILS-User-Message may be a responding email that includes the user's response to the registration form in accordance with instructions for filling out the form, wherein the responding email identifies who originally sent the request by referring to one of the headers (vide infra) containing the user 10's email id (e.g. student@home.org) to which mailbox the response is to be sent. A Special-MAILS-Message may comprise, inter alia, Acknowledgment-Msg, Timeout-Msg, Error-Msg, End-of-session-Msg, Terminate-Msg, etc.

Step 41 determines whether the received message is a MAILS-User-Message. If step 41 determines that the received message is not a MAILS-User-Message, then step 41 assumes that the received message is a Special-MAILS-message which is processed in step 42 and described in greater detail in FIG. 9. Following execution of step 42 the method loops back to step 39 to resume monitoring active MAILS sessions. If step 41 determines that the received message is a MAILS-User-Message, then step 43 displays the MAILS-User-Message. Step 43 is described in greater detail in FIG. 8.

Following execution of step 43, the user 10 is prompted to fill out the registration form in step 44 and to submit the completed registration form in step 45. Step 46 processes the registration form, such as by extracting content from designated fields of the registration form and preparing a MAILS-Form-Message from the extracted content. Step 47 sends the processed MAILS message (e.g., the MAILS-Form-Message) to the MAILS server 26. Step 47 is described in greater detail in FIG. 6.

Figure 5:
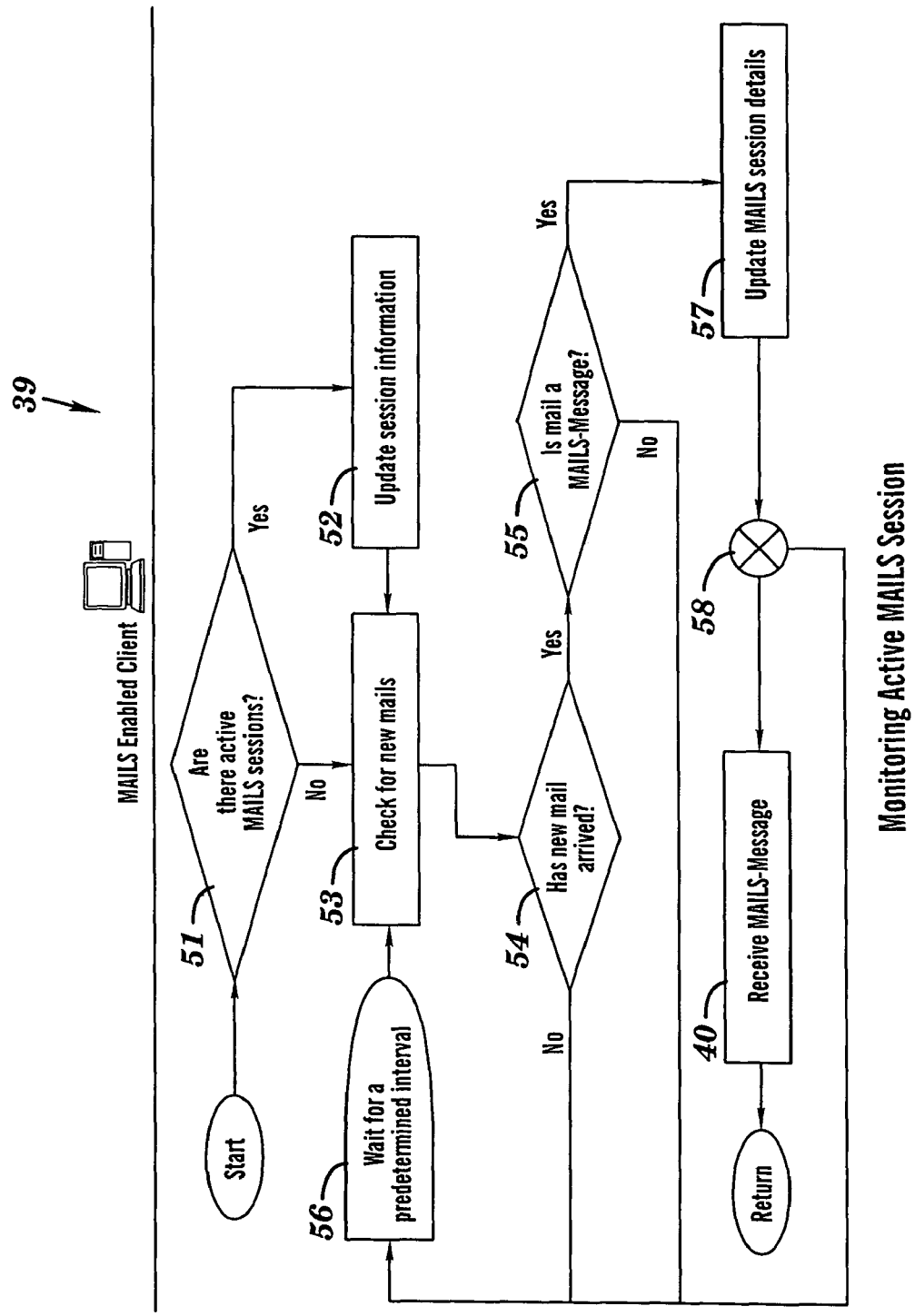

FIG. 5 is a flowchart for implementing step 39 of FIG. 4 by execution of the MAILS-enabled client 21, for monitoring active MAILS as depicted in steps 51-58 and 40, in accordance with embodiments of the present invention.

Step 51 determines whether there are active MAILS sessions in existence. If step 51 determines that there are active MAILS sessions in existence, then step 52 (that occurs once at the time of startup) updates session information in relation to the MAILS client. Session information includes the client email id, which will be made available for future sessions. Similarly, the next value of a series may be used for generating unique session identifier for the next session-to-be. Other session information such as server id or URL, server port and timestamp are individual session specific and cannot be updated at this time. Following execution of step 52, step 53 is executed. If step 51 determines that there are no active MAILS sessions in existence, then step 53 is next executed. Step 53 checks for new mail having arrived in the user's mailbox. Step 54 is next executed following step 53.

Step 54 determines whether new mail has arrived in the user's mailbox. If step 54 determines that new mail has not arrived in the user's mailbox, then step 56 waits for a predetermined time interval (typically 10-100 ms but this can by any time interval, depending upon the requirements) and then loops back to step 53 to again check for new mail having arrived in the user's mailbox. If step 54 determines that new mail has arrived in the user's mailbox, then step 55 is next executed.

Step 55 determines whether the new mail is a MAILS message, such as by a tag in the mail header (e.g., <MAILS ID>2345F</MAILS ID>), or by the Multipurpose Internet Mail Extensions (MIME) type of the message being MAILS, etc. If step 55 determines that the new mail is not a MAILS message, then the method loops back to step 56. If step 55 determines that the new mail is a MAILS message, then step 57 is next executed. Step 57 updates MAILS session details.

Step 58 divides execution into two paths, namely a first path to step 40 (also shown in FIG. 4 and described in greater detail in FIG. 7) which receives the MAILS message and a second path which loops back to steps 56 and 53 to resume checking for new mail in the user's mail server 22 (step 53) after a waiting predetermined period of time (step 56).

Figure 6:
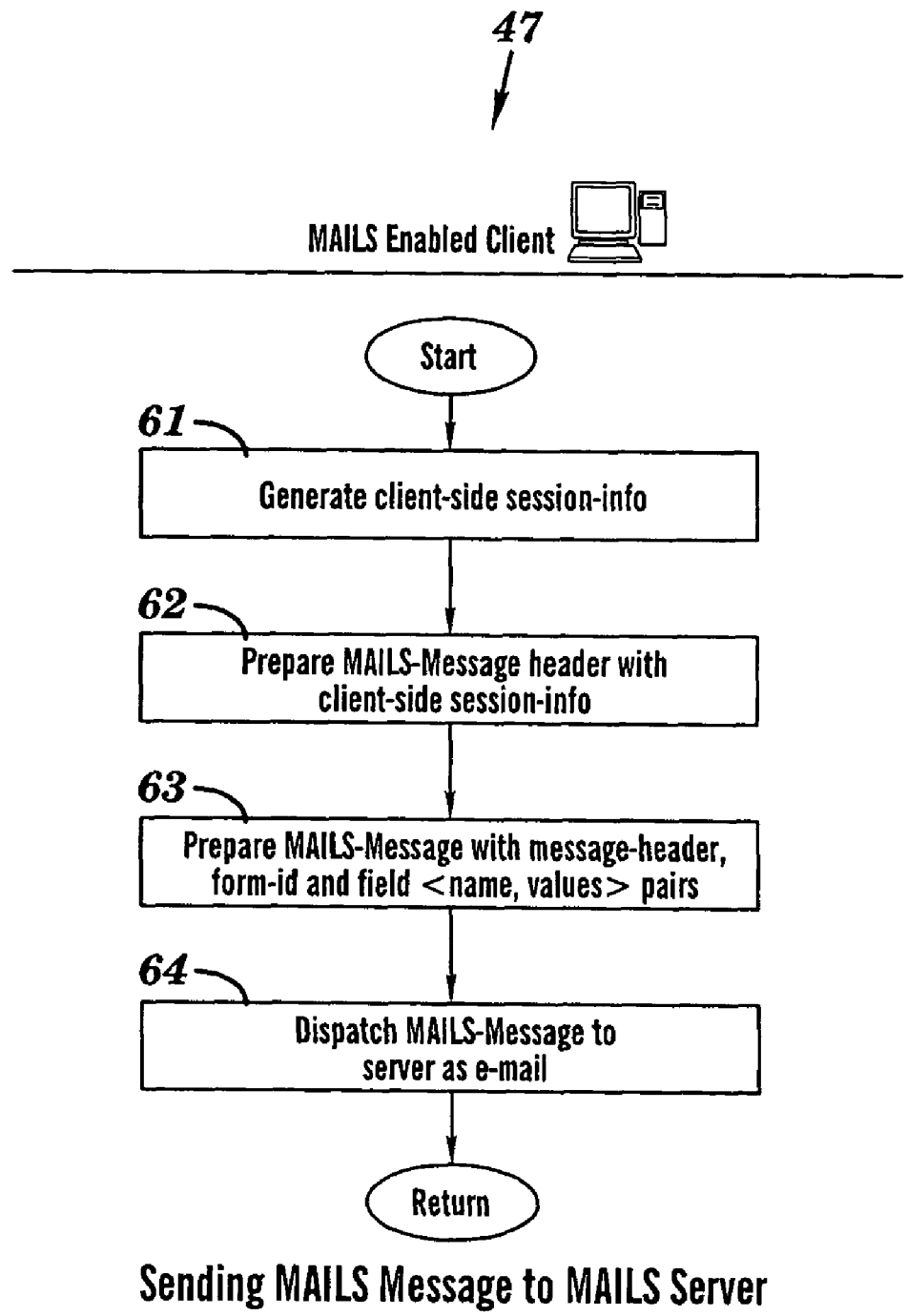

FIG. 6 is a flowchart for implementing step 47 of FIG. 4 by execution of the MAILS-enabled client 21, for sending the processed MAILS message to the MAILS server 26 as depicted in steps 61-64, in accordance with embodiments of the present invention. MAILS-Messages are exchanged between the MAILS server 26 and the MAILS-enabled client 21 as e-mails that can be interpreted by the server and clients. The e-mail exchange may follow any of the standard mail protocols such as SMTP.

Step 61 generates client-side session information which may include, inter alia, client's email ID and client port, wherein client port is a unique ID generated by MAILS client to differentiate multiple MAILS sessions.

Step 62 prepares a MAILS-Message header with client-side session information.

Step 63 prepares a MAILS-Message with message header, form-id and <name, value> pairs for the form-fields (e.g. name is "name" or "course" and value is "Kumar" or "Computational Biology" in the following XML). The format for the MAILS-Message may be an Extensible Markup Language (XML) format as follows:

```
<MAILS-ENV>
    <headers>
        <clientport> 67348 </clientport>
        <serverport> 8090 </serverport>
    <headers>
    <body>
        <fields>
            <name> Kumar </name>
            <course> Computational Biology </course>
```

-continued

```
      ......
    </fields>
   </body>
</MAILS-ENV>
```

Step 64 dispatches MAILS-Message to server as e-mail. Before dispatching the message, this process can, without change, be extended to handle existing techniques relating to: message security (through a combination of encryption and selection of key-transfer channel methodology (e.g. DES, RAS, etc., as well as Link-level Encryption or LLE), authenticity (through electronic signing a.k.a. digital signature methodology), transaction, etc.

Figure 7:
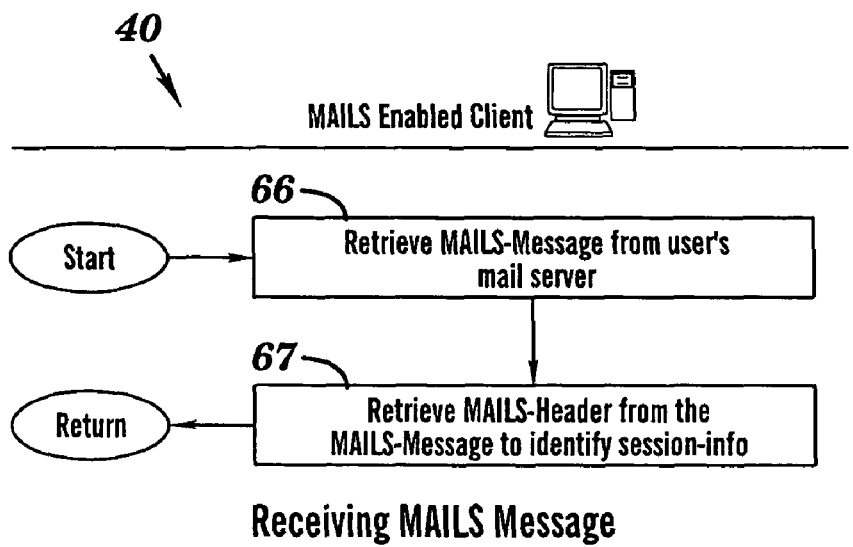

FIG. 7 is a flowchart for implementing step 40 of FIG. 4 by execution of the MAILS-enabled client 21, for receiving a MAILS-Message from the user 10 as depicted in steps 66-67, in accordance with embodiments of the present invention.

Step 66 retrieves the MAILS-Message from the user's mail server 22. There are various alternative ways a user 10 may be connected to a mail server 22, vide supra.

Step 67 retrieves the MAILS-Header from the MAILS-Message to identify session information. After receiving the message, this process can be extended to handle: message security (through encryption), authenticity (through electronic signing), transaction, etc.

Figure 8:
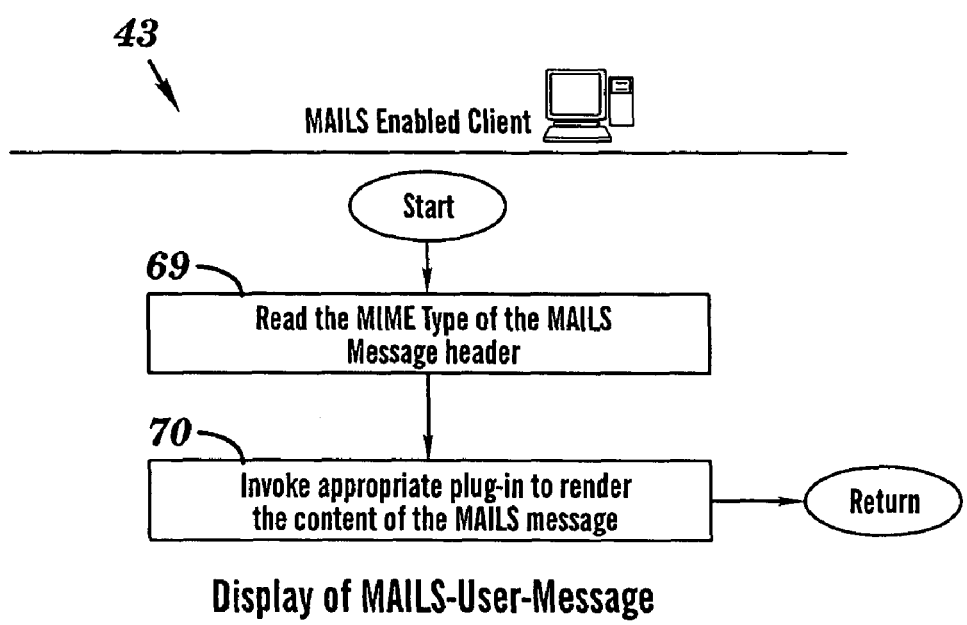

FIG. 8 is a flowchart for implementing step 43 of FIG. 4 by execution of the MAILS-enabled client 21, for displaying the MAILS-USER-Message as depicted in steps 69-70, in accordance with embodiments of the present invention.

Step 69 reads the MIME type of the MAILS Message header. The MIME type of the message could denote content-type (e.g., MAILS/htttml, MAILS/pdf, etc.).

Step 70 invokes an appropriate plug-in to render the content of the MAILS message. For example, if the MIME type of the message is, for example, MAILS/html, then the message would be rendered similar to a HTML document (as is done by the Web browser).

Figure 9:
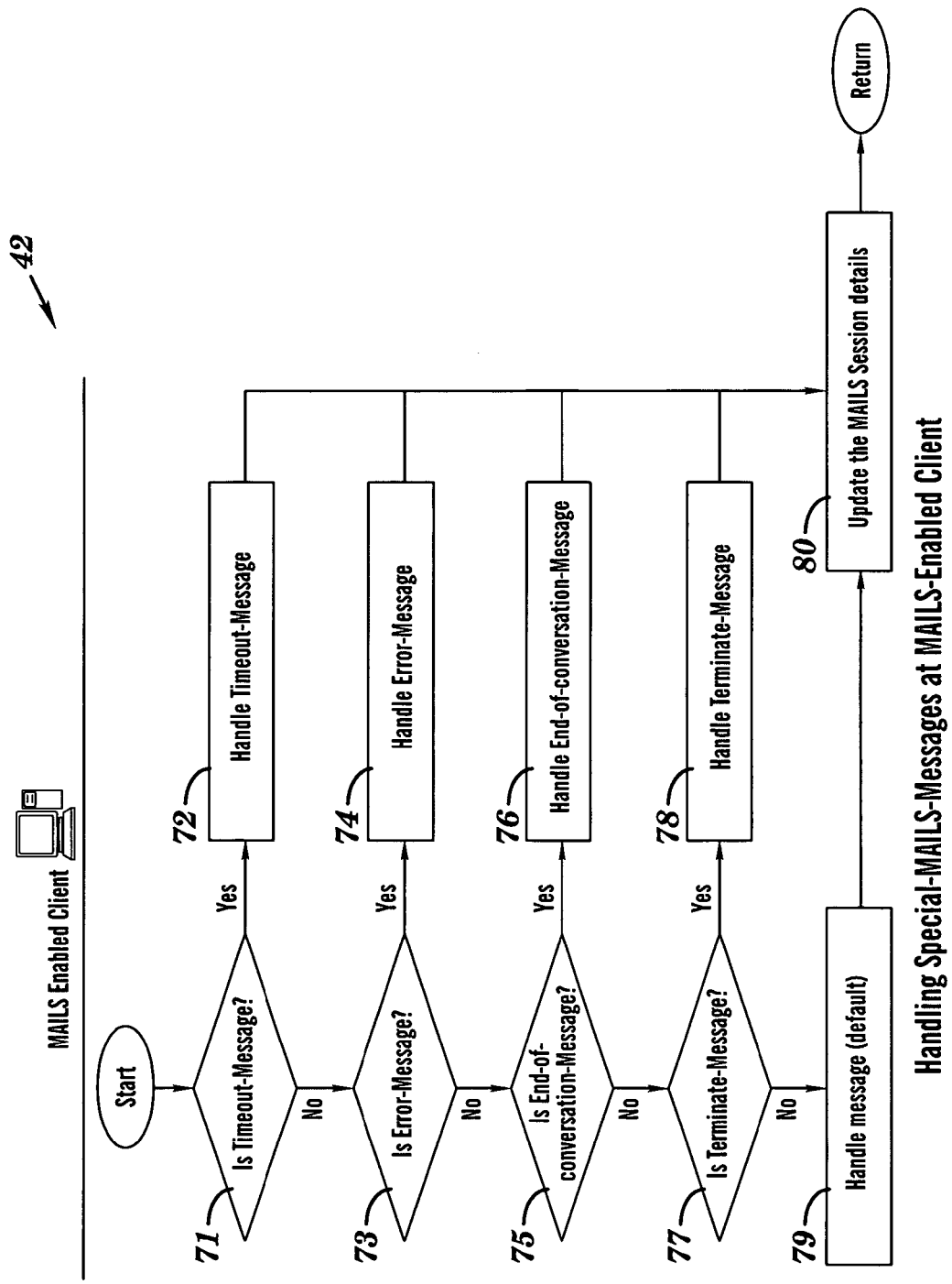

FIG. 9 is a flowchart for implementing step 42 of FIG. 4 by execution of the MAILS-enabled client 21, for handling Special-MAILS-Messages at the MAILS-enabled Client 21 as depicted in steps 71-80, in accordance with embodiments of the present invention. The Special-MAILS-Messages may comprise a timeout message, an error message, an end-of-conversation message, a terminate message, etc. It may be noted that the organization of the flowchart is only indicative; there could be alternative ways that might use a two-step process. The first step determines if there is a message. The second step will then trigger the appropriate handler. This might be useful if the default type is more common.

Step 71 determines whether the special-MAILS-Message is a timeout message. If step 71 determines that the special-MAILS-Message is a timeout message, then step 72 handles the timeout message. If step 71 determines that the special-MAILS-Message is not a timeout message, then step 73 is next executed.

Step 73 determines whether the special-MAILS-Message is an error message. If step 73 determines that the special-MAILS-Message is an error message, then step 74 handles the error message. If step 73 determines that the special-MAILS-Message is not an error message, then step 75 is next executed.

Step 75 determines whether the special-MAILS-Message is an end-of-conversation message. If step 75 determines that the special-MAILS-Message is an end-of-conversation message, then step 76 handles the end-of-conversation message.

If step 75 determines that the special-MAILS-Message is not an end-of-conversation message, then step 77 is next executed.

Step 77 determines whether the special-MAILS-Message is a terminate message. If step 77 determines that the special-MAILS-Message is a terminate message, then step 78 handles the terminate message. If step 77 determines that the special-MAILS-Message is not a terminate message, then step 79 is next executed.

Step 79 is a catchall that traps any type of message with a special handler. Whatever the message type may be, step 80 is invoked to update session-related information.

FIGS. 10-13 describe processes performed by the MAILS server 26 of FIG. 2, in accordance with embodiments of the present invention.

Figure 10:
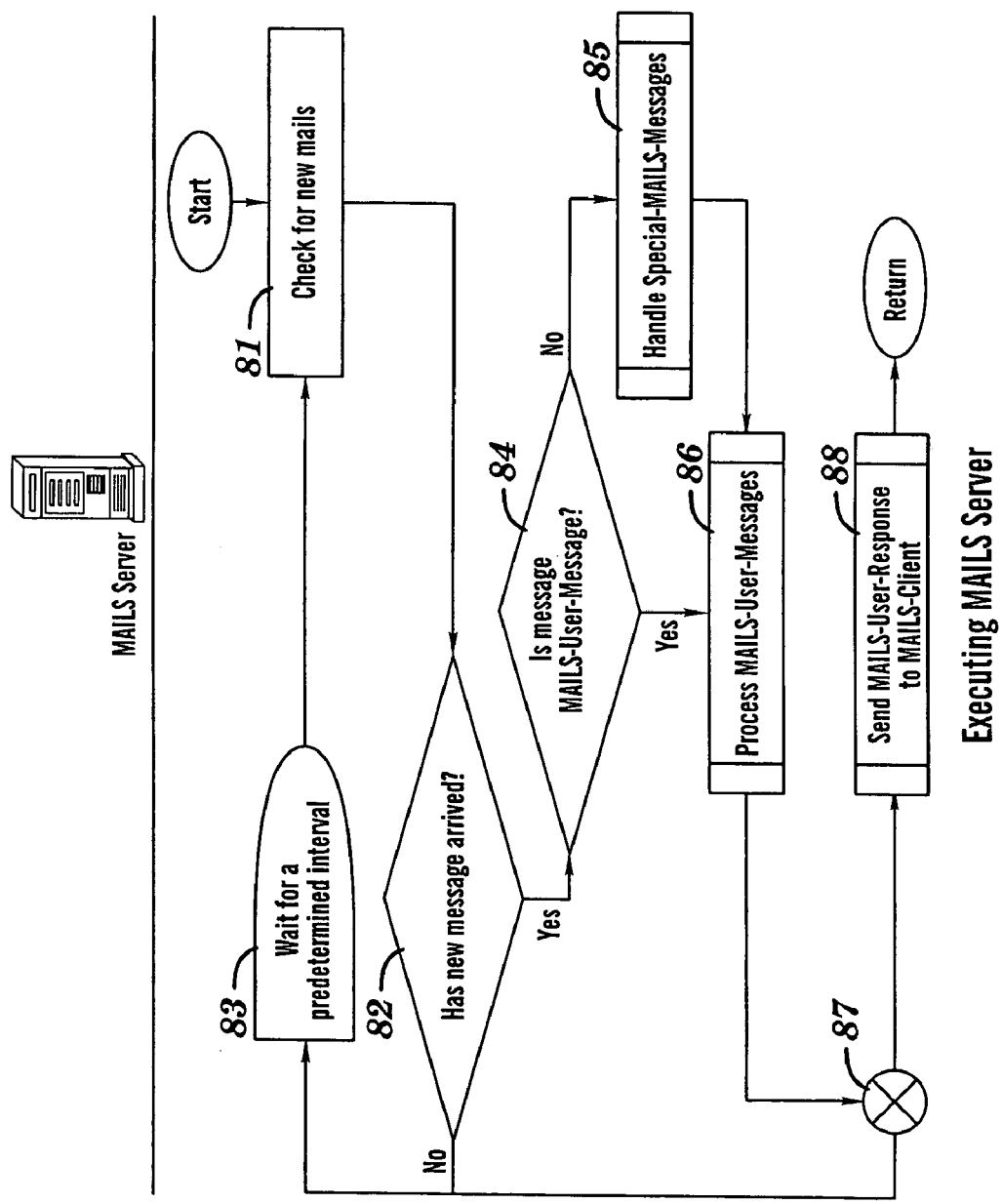
FIGS. 10-13 describe processes performed by the MAILS server of FIG. 2, in accordance with embodiments of the present invention.

FIG. 10 is a flowchart describing processes performed by the MAILS server 26 as depicted in steps 81-88, in accordance with embodiments of the present invention.

Step 81 checks for new mail in the Application's mail server 26. Step 82 determines whether new mail of a MAILS-Message has arrived in the Application's mail server 26. If step 82 determines that new mail of a MAILS-Message has not arrived in the Application's mail server 26, then step 83 waits for a predetermined time interval (e.g., a few ms., etc.) and then loops back to step 81 to again check for new mail having arrived in the Application's mailbox (located within the Application's eMail server 25). If step 82 determines that new mail has arrived in the Application's mail server 26, then step 84 is next executed.

Step 84 determines whether the new MAILS-Message is a MAILS-User message rather than a Special-MAILS-Message. If step 84 determines that the new MAILS-Message is not a MAILS-User Message, then the new message is a Special-MAILS-Message which is processed in step 85 after which step 86 is next executed. If step 84 determines that the new MAILS-Message is a MAILS-User Message, then step 86 is next executed.

Step 85 processes Special-MAILS-Messages. An example of a Special-MAILS-Message is an initial request for a new session transmitted as mail. When the initial request is received, the foremost task would be to handle such request adequately and appropriately from the point of view of resources vs. load and policy. These tasks may not be strictly the business logic. With normal application servers, often this is independently managed by the server. Strictly speaking this does not concern MAILS implementation, inasmuch as security or transactions don't concern MAILS implementation. Other existing facilities to handle them can be used without changing MAILS implementation. Hence, once the message is analyzed with the context from headers, the actual execution might be delegated to an application server component. Once these tasks are completed, the business application is invoked to obtain the initial transaction-specific content for the MAILS-Response-Message. Other examples of Special-MAILS-Messages may include: acknowledgments, error message (e.g., destination unreachable, timeout, mail server not responding, etc.), MAILS session termination initiated by client, etc. In addition to processing application-specific messages, the process can be extended to handle security (vide infra), redundant request, spam, etc. Step 85 is described in greater detail in FIG. 13.

Step 86 processes the MAILS-User-Message to prepare a MAILS-Service-Request-Message and sends the MAILS-Service-Request-Message to the application server 14 for processing by the University Registration Application Components 19. Step 86 is described in greater detail in FIG. 11.

Step 87 divides execution into two paths, namely a first path to step 88 and a second path which loops back to steps 83 and 81 to resume checking for new mail in the Application's mail server 25 (step 81) after a waiting predetermined period of time (step 83). Step 88 sends the response, called MAILS-USER-Response, received from the application server 14 to the MAILS-enabled client 21. Step 88 is described in greater detail in FIG. 12.

Figure 11:
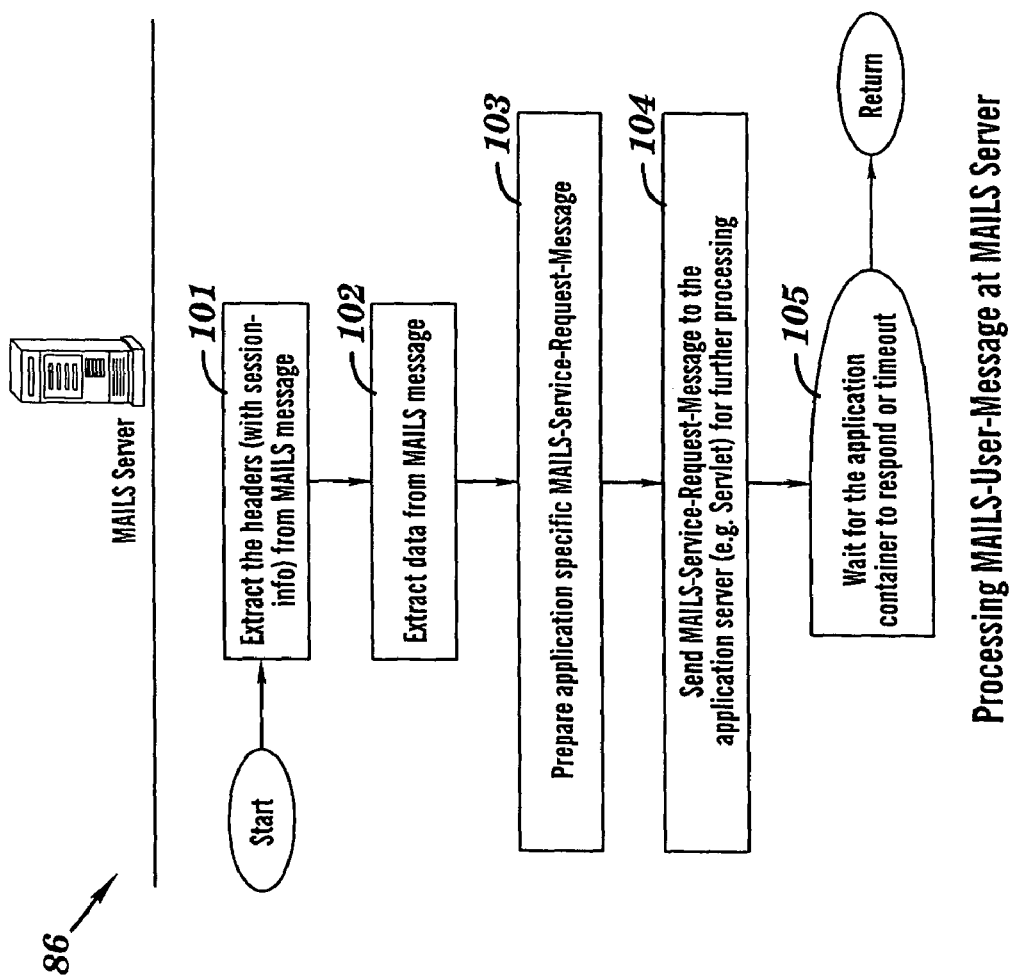

FIG. 11 is a flowchart for implementing step 86 of FIG. 10 by execution of the MAILS server 26, for processing the MAILS-User-Message at the MAILS Server 26 as depicted in steps 101-105, in accordance with embodiments of the present invention.

Step 101 extracts the headers of the message (with session information) from the MAILS message and step 102 extracts data from the MAILS message.

Step 103 prepares application-specific MAILS-Service-Request-Message from the headers and data extracted from the MAILS message. For the MAILS server to interact with the business application, the "Plugin for Servlet" in FIG. 2 implements the MAILS interface.

For example, in a Web application that is hosted on an application server, a HTTP request is received by the Web server and the Web server passes on the HTTP request to the servlet engine 16 along with the context. The servlet engine 16 passes the HTTP request on to a servlet. The servlet in turn invokes the business application (if needed) to process such request.

In the same way, the MAILS server passes the MAILS request to the "Plugin for Servlet" in FIG. 2. The "Plugin for Servlet" in FIG. 2 invokes one the University Registration servlets 17, as appropriate, to process the MAILS request.

Step 104 sends the MAILS-Service-Request-Message to the application server 14 (e.g., to the servlet 17) for further processing by the University Registration Application Components 19.

Step 105 waits for the application container to respond to the MAILS-Service-Request-Message or to timeout.

Figure 12:
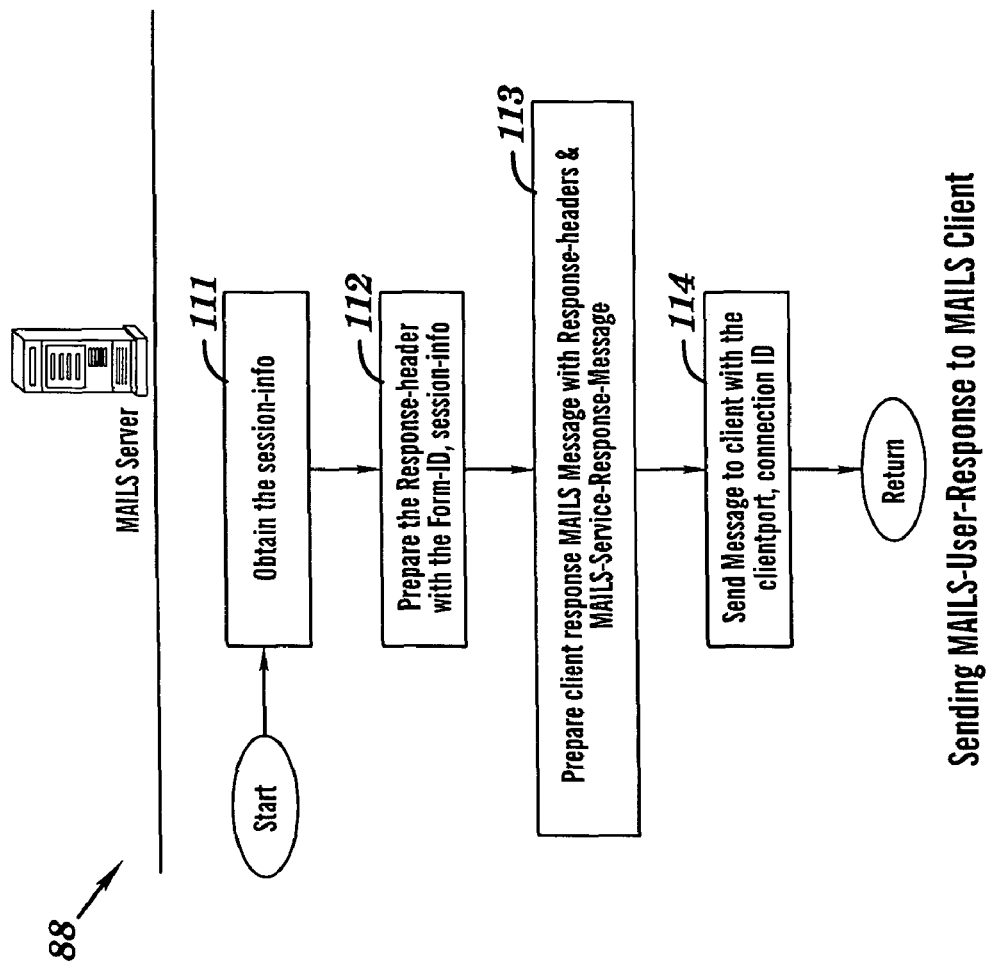

FIG. 12 is a flowchart for implementing step 88 of FIG. 10 by execution of the MAILS server 26, for sending a response to the MAILS-enabled client 21 as depicted in steps 111-114, in accordance with embodiments of the present invention.

Step 111 obtains the session information.

Step 112 prepares a Response-header with the Form-ID and session information.

Step 113 prepares the client response MAILS Message with Response headers and the MAILS-S ervice-Response-Message.

Step 114 sends the MAILS-Service-Response-Message to the MAILS-enabled Client 21 at the client port, connection ID.

With Client-side session tracking, multiple MAILS sessions can be handled by the MAILS client and the session tracking by the client is done via session information. With Server-side session tracking, the session tracking by the server is done by the session information, which includes the client's email id, clientport, server email id, and serverport.

Figure 13:
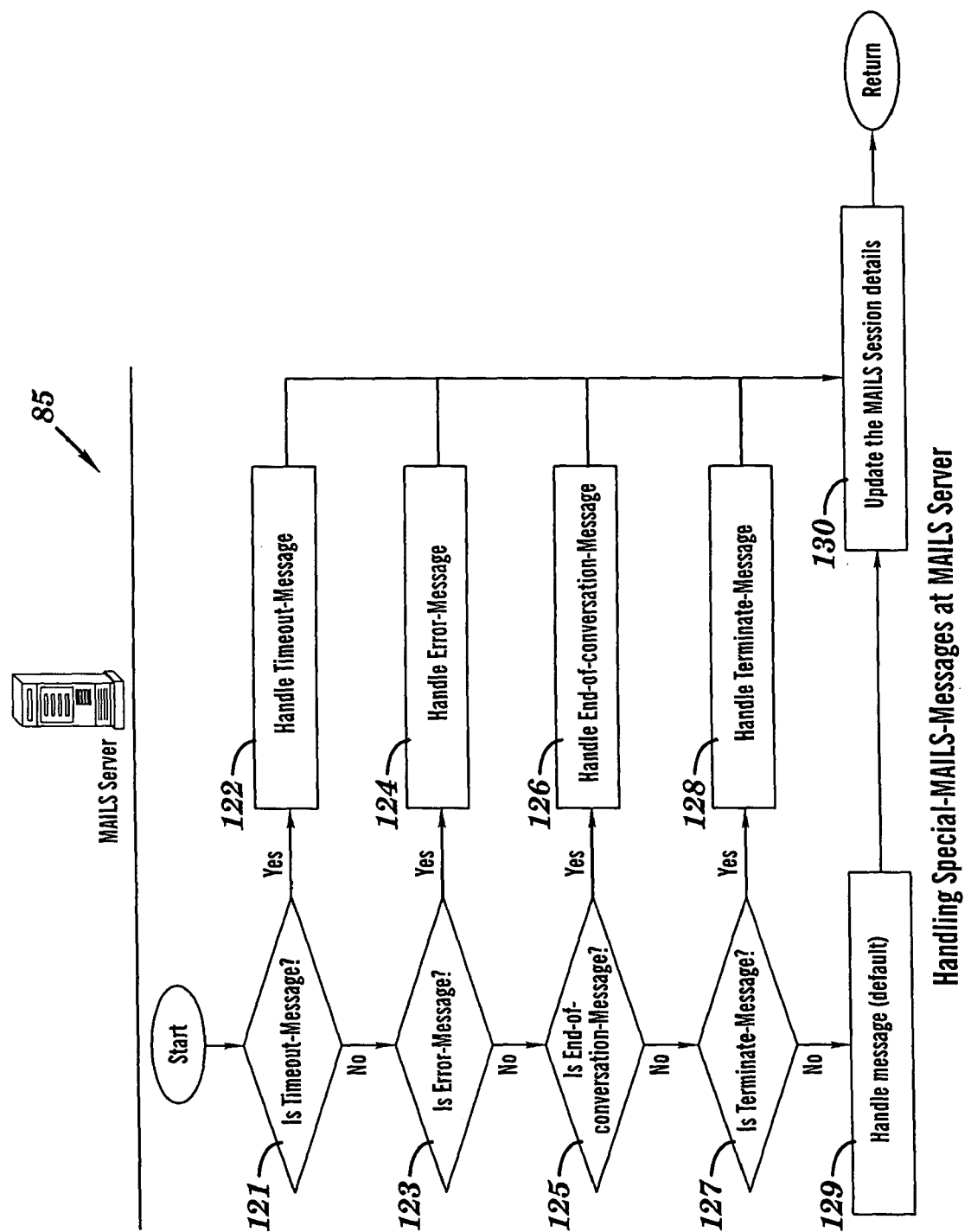

FIG. 13 is a flowchart for implementing step 85 of FIG. 10 by execution of the MAILS server 26, for handling Special-MAILS-Messages at the MAILS server 26 as depicted in steps 121-130, in accordance with embodiments of the present invention. The Special-MAILS-Messages may comprise a timeout message, an error message, an end-o-conversation message, a terminate message, etc.

Step 121 determines whether the special-MAILS-Message is a timeout message. If step 121 determines that the special-MAILS-Messages is a timeout message, then step 122 handles the timeout message. If step 121 determines that the special-MAILS-Message is not a timeout message, then step 123 is next executed.

Step 123 determines whether the special-MAILS-Message is an error message. If step 123 determines that the special-MAILS-Message is an error message, then step 124 handles the error message. If step 123 determines that the special-MAILS-Message is not an error message, then step 125 is next executed.

Step 125 determines whether the special-MAILS-Message is an end-of-conversation message. If step 125 determines that the special-MAILS-Message is an end-of-conversation message, then step 126 handles the end-of-conversation message. If step 125 determines that the special-MAILS-Message is not an end-of-conversation message, then step 127 is next executed.

Step 127 determines whether the special-MAILS-Message is a terminate message. If step 127 determines that the special-MAILS-Message is a terminate message, then step 128 handles the terminate message. If step 127 determines that the special-MAILS-Message is not a terminate message, then step 129 is next executed.

Step 129 is a catchall handler that deals with all other messages. Then step 130 updates the MAILS session details.

The preceding flow charts of FIGS. 3-13 flowcharts illustrate: (a) functionality of MAILS Client; (b) functionality of MAILS Server; and (c) interactions between the MAILS client and MAILS server. Details of the MAILS protocol are discussed next.

While FIGS. 1-13 described a synchronous transmission of a first message by electronic mail from the user 10 the Univ. Registration Application Components 19 and transmission of a synchronous response thereto by electronic mail from the Registration Application Components 19 to the user 10, the first message generally includes any form of message (e.g., document, data, graphics etc.) synchronously transmitted by electronic mail from a user to a software application via the MAILS client and the MAILS server as described supra. In addition, the first message may provide a service performed by the user (e.g., providing a document, data, graphics, etc.) to the application server or to a user of the application server.

The transmitted first message may or may not require a responsive second message from the software application to the user. If the software application responds to the first message with the second message, then the second message is synchronously transmitted by electronic mail from the software application to the user via the MAILS server and the MAILS client as described supra. The second message generally includes any form of message (e.g., document, data, graphics etc.) synchronously transmitted by electronic mail from the software application to the user via the MAILS client and the MAILS server as described supra. In addition, the second message may provide a service to the user by the application (e.g., providing a document, data, graphics, etc.).

FIG. 14 depicts a MAILS protocol stack on a TCP/IP protocol stack, in accordance with embodiments of the present invention. The said stack will be very similar with other protocol suites (vide supra) with change only in the layers below MAILS and an asynchronous mail protocol (e.g. SMTP), according to the specifications of such protocol suite. In FIG. 14, Transmission Control Protocol (TCP) is an intermediate layer between the Internet Protocol (IP) IP layer below and the SMTP application layer above. The MAILS protocol is an extension to standard email protocol (e.g., SMTP in FIG. 14). Through this extension, the MAILS protocol is made to mimic the HTTP Request-Response mechanism, and the MAILS protocol is thus a state-less protocol, by providing a synchronous wrapper to the email protocol (which is an asynchronous protocol) that will responds to every incoming mail synchronously. Typically, a request is submitted by the MAILS-Client and the protocol can be described through the following scenarios: (1) Client 'sends' a Request to the MAILS-Server; and (2) Client 'receives' a Response from the MAILS-Server. From the time a request is submitted by the client, until a response is received from the server, a logical connection is maintained between the server and client. Hence, the MAILS protocol is a state-less protocol as illustrated by FIG. 15.

Figure 15:
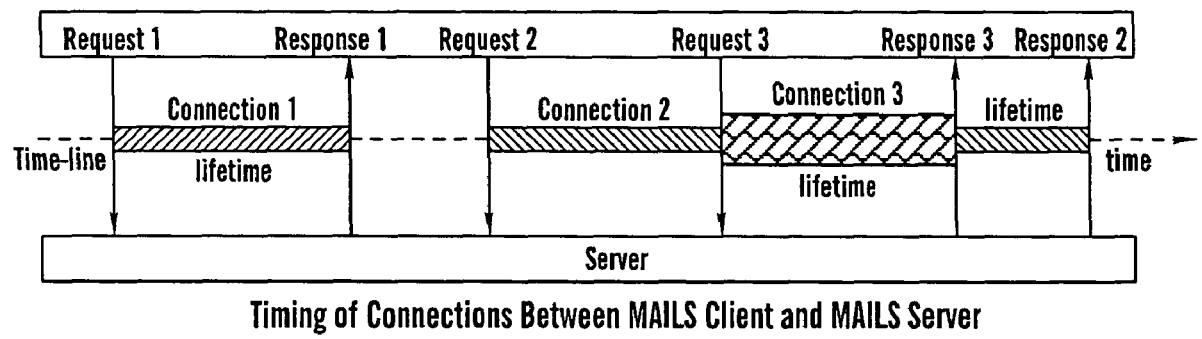
FIG. 15 depicts the timing of logical connections between a MAILS Client and a MAILS Server, in accordance with embodiments of the present invention.

FIG. 15 depicts the timing of logical connections between a MAILS Client and a MAILS Server, in accordance with embodiments of the present invention. The MAILS Server and the MAILS Client maintains the connection information (as an object), since overlapping connections may exist as between Connection 2 and Connection 3 illustrated in FIG. 15.

The MAILS protocol is designed under the assumption that the MAILS Server and the MAILS Client provide application-level flow control (or session management) for a chain of client-server interaction. This is analogous to HTTP-based applications, wherein the Application Servers 14 are responsible for such common functions as state, transaction, failover, etc.

FIG. 16 illustrates MAILS message encapsulation, in accordance with embodiments of the present invention. A normal MAILS-Request message and a MAILS-Response message, which have been referred to as MAILS-User Message, are encapsulated in the email Message Body as shown in FIG. 16. The TCP layer is reminiscent of earlier example using TCP/IP protocol suite.

The MAILS-Message in FIG. 16 could alternatively be: MAILS-User Message; MAILS-Error Message; MAILS-Timeout Message; MAILS-EndOfConversation Message; MAILS-Terminate Message.

FIG. 17 illustrates a MAILS-Header having an illustrative format, in accordance with embodiments of the present invention. The MAILS-Header part of the message differentiates the User message from the other special messages. In addition, the MAILS-Header message includes the information related to the ongoing session. An element 'custom-info' in the Message Header may be provided for extensibility purposes. The 'custom-info' information may be used by the MAILS-Client or MAILS-Server while interpreting the Message Body. A complete XML schema for the MAILS-ENV is described infra.

A MAILS-Timeout Message is an error message indicating that time is up for waiting for a response to arrive.

A MANS-EndOfConversation Message ("EOC Message") is a dialogue between the client and the server, wherein the "handshake" is initiated by the client and responded to by the server. At the end of conversation, the client effectively says "I am done with" and the server effectively says, "OK" while waiting for some time before terminating the connection from the server end. The client waits for the server's acknowledgment to arrive before terminating the connection from the client's end.

The client's initial EOC message may never have arrived at the server and in such a case, the client might have to resend the EOC message a number of times (e.g., a predetermine number of times). However, when an EOC message from the client arrives at the server, the server knows that the purpose of the connection has come to an end. Thus, there is no point for the server to continue with the connection. However, the client should normally wait for the server to respond with an acknowledgment of the EOC message, because the client has no other way to know whether the server has received its EOC message. In addition, the server may have received the EOC message, but the server's response may have been lost in the network and never arrived at the client. Hence, the client may close the connection after waiting a predetermined interval of time.

A MAILS-Terminate Message discloses termination of the connection, If the client fails to receive any acknowledgment from the server after sending the EOC message a predetermined number of times, the client may send a yet new kind of message, "Terminate" and close the connection from the client's end.

The preceding discussion described simple connections and their termination. A more complex connection scheme involves a periodic exchange of a "dummy" message between the client and the server to determine whether the client has closed its end of the connection. Such a dummy message may be called a "heartbeat". However, there may be a trade-off between the benefit and the overhead, which is application dependent.

Figure 18:
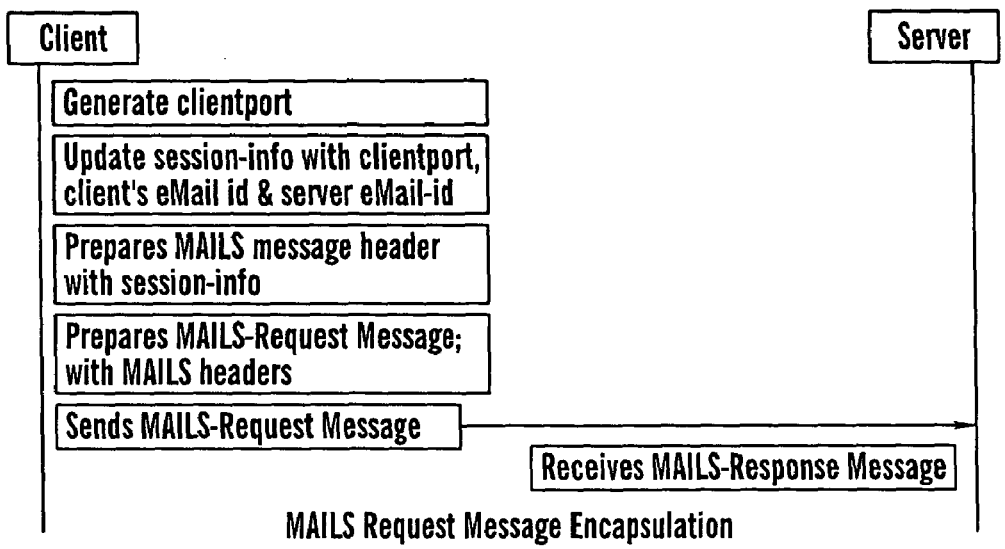
FIG. 18 illustrates MAILS request message encapsulation, in accordance with embodiments of the present invention.

FIG. 18 illustrates MAILS request message encapsulation, in accordance with embodiments of the present invention. One client and one server interaction is assumed for simplicity purposes only. In FIG. 18, Client 'sends' a Request to the MAILS-Server and FIG. 18 illustrates how the client and server establish a connection to send a MAILS-Request Message. A connection between the client and the server is defined by the 4-tuple called the session-info, which includes the following: (a) {clientport, serverport}; (b) email-id of the client; (c) email-id of the server; (d) time-stamp (at the start of connection).

The clientport and the serverport are unique identifiers that are generated by the Client and Server respectively. In the limited proof-of-concept implementation, an integer number was used as clientport/serverport, and its uniqueness was limited to a single client/server node. However, this does not necessarily create a limitation as the example can be easily extended to any number of clients or servers using their IP addresses as prefixes to the next value of a series generated by each one of them. The IP addresses, being universally unique, would have the same effect as a namespace. In case of sharing of such addresses (for example, two servers are running on the same host), port could be used in addition. Thus the whole of the connection identifier would become [[<IP address><delimiter>]<Port><delimiter>]<Next value of a series local to the client or the server>. The "delimiter" could be blank or any other character. Square brackets represent optional extensions.

When the client initiates the session and prepares the MAILS-Request Message, only the client-side information (e.g., the clientport, the client's email id, and the target email id) are filled. At this point in time, the session-info is in a half-connected state. When the server responds with the MAILS-Response Message, the session-info in the response message will have all the relevant details and hence is in a full-connected state. This session-info can be used by the client and server in all further communication to envelope a series of requests and responses in a state (vide infra), giving them the context of one and the same connection. The client or the server could invalidate the session-info when the session is closed or terminated.

The MAILS protocol for a request message uses the following fields of the SMTP mail:

(a) From field, with the source email id;
(b) To field, with the target email id;
(c) Subject field, with the MAILS welcome message (optional);

(d) Body field, with the XML payload that adheres to the XML Schema described infra.

Error conditions that can arise in the MAILS protocol, while the Client 'sends' a request message to the Server, comprise an Invalid MAILS message and/or an SMTP error. An Invalid MAILS message is sent by the MAILS server if the MAILS server receives an invalid (e.g., indecipherable) message. An SMTP error is an error message sent by the SMTP layer to the client.

The MAILS Response messages include a placeholder to include appropriate MAILS error message. In addition, the use of SMTP service as a transport mechanism for MAILS necessitates the use of mail service that takes care of the following issues: (a) Identity spoofing, where a malicious user can send email as another user; and (b) Spamming, where a mailbox can be pounded with large volumes of junk mail. MAILS protocol does not address any of these concerns and exploits an appropriate implementation of the SMTP service that can address these concerns.

Figure 19:
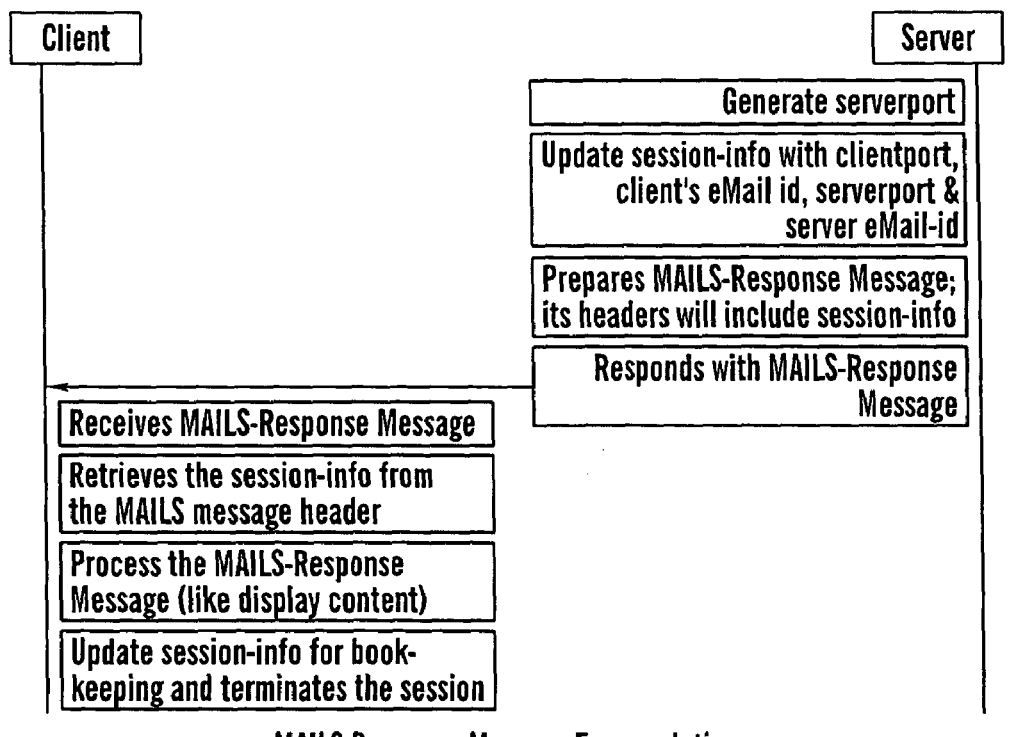
FIG. 19 illustrates MAILS response message encapsulation, in accordance with embodiments of the present invention.

FIG. 19 illustrates MAILS response message encapsulation, in accordance with embodiments of the present invention. One client and one server interaction is assumed for simplicity purposes only. In FIG. 19, Client 'receives' a Response from MAILS Serve. This scenario illustrates the responsibilities of the client and the server, when a MAILS Response message is prepared and sent back to the client.

The MAILS protocol for a response message uses the following fields of the SMTP mail:

(a) From field, with the source email id;
(b) To field, with the target email id;
(c) Subject field, with the MAILS welcome message (optional);
(d) Body field, with the XML payload that adheres to the XML Schema described infra.

Error conditions that can arise in the MAILS protocol, while the Client 'sends' a request message to the Server, comprise an Invalid MAILS message and/or an SMTP error. An Invalid MAILS message is sent by the MAILS server if the MAILS server receives an invalid (e.g., indecipherable) message. An SMTP error is an error message sent by the SMTP layer to the client.

MAILS may interface with POP3, or directly with SMTP, or with IMAP or any other protocols implementing asynchronous mail. The MAILS service periodically checks arrival of e-mails from a given email-Id. MAILS transmits faithfully any error messages turned out by the interfacing application.

Figure 20:
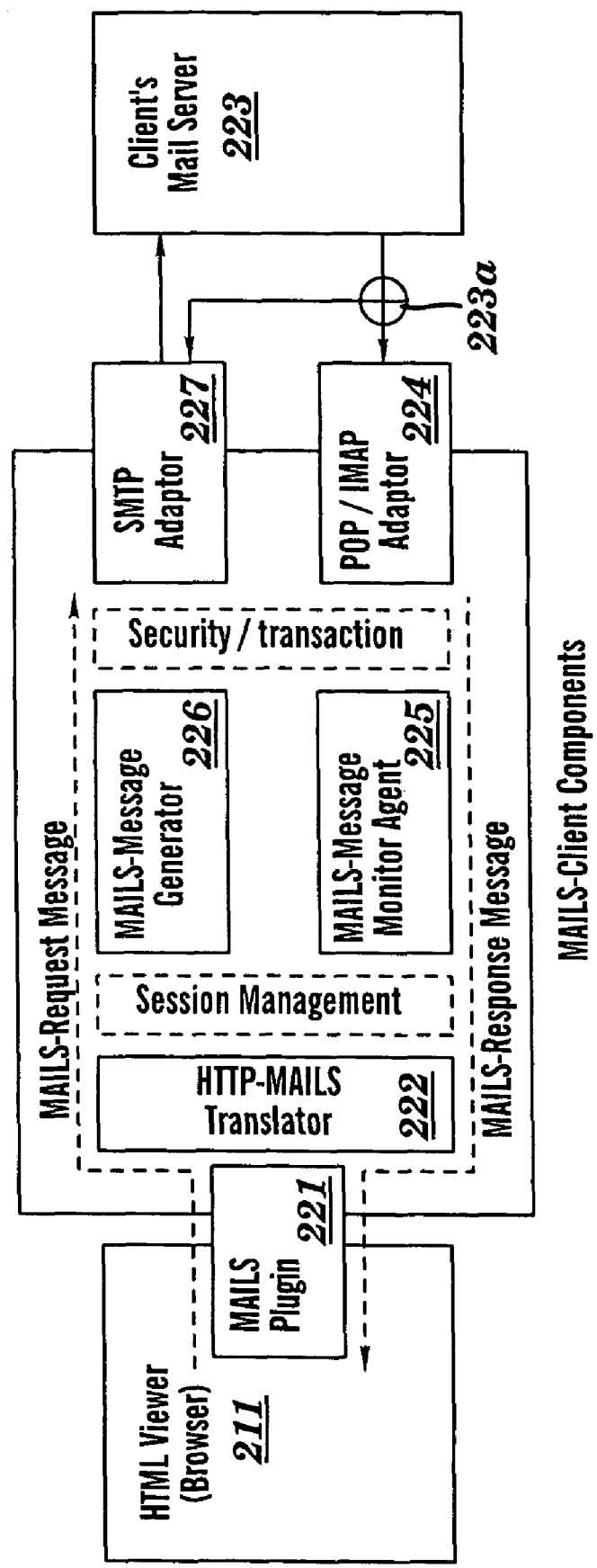
FIG. 20 illustrates MAILS-Client components, in accordance with embodiments of the present invention.

FIG. 20 illustrates MAILS-Client components, in accordance with embodiments of the present invention. FIG. 20 shows how the MAILS-Client components interconnect the Client's Mailbox 223 to the HTML Viewer 211 (Web browser). The Client's Mail server 223 corresponds to the user's mail server 22 in FIG. 2. The MAILS Plugin 221 of the HTML Viewer 211 acts as a controller component which is activated on user-action (e.g., button pressed action, mouse-click on the URL-hotspot, Open a URL etc.). The request for resource (with URL) is transferred to the HTML-MAILS Translator 222 which prepares a MAILS-Message for being sent to the MAILS-Server using the SMTP Adapter 227 after the message received from the user 10 has been processed by the MAILS-Message Generator 226. The client's incoming eMails are monitored continuously by the MAILS-Message Monitor Agent 225. The POP/IMAP Adapter 224 acts as an interface component for the MAILS-Message Monitor Agent 225 to enable the MAILS-Message Monitor Agent 225 to continuously pull email from the Client's mail server 223 and process all valid MAILS-Messages while returning error-messages (MAILS, mail, or HTTP, as appropriate (it may be noted here that the extensive set of HTTP error messages are very pertinent to MAILS in most cases, which is why such messages may be reused in MAILS) for out-of-normal conditions. A valid MAILS-Response message is transcribed to HTML by the MAILS Plugin 221, before sending it to the HTML Viewer to be rendered. The MIME format is retained, which is assumed HTML. MAILS plugin 221 to the HTML Viewer 211 (browser) opens the browser up automatically, enabling the user to view the HTML content. The logical AND 223a depicts the alternative (or) configurations of client's Mail server 223 with respect to the client (vide supra).

In addition, components such as Session Management, Security etc. offer value-added support to the MAILS Client to handle multiple server sessions, to handle share session information across multiple client-server connection, to encrypt/decrypt the message, to digitally sign messages that are sent, etc.

Figure 21:
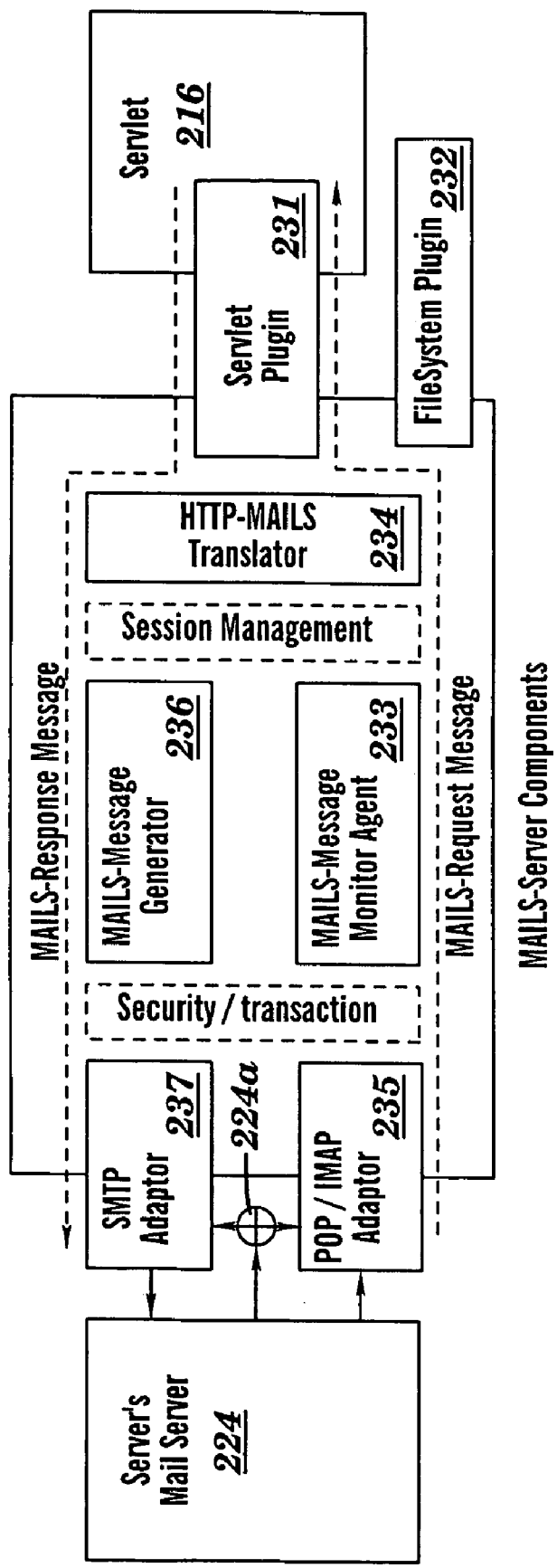
FIG. 21 illustrates MAILS-Server components, in accordance with embodiments of the present invention.

FIG. 21 illustrates MAILS-Server components, in accordance with embodiments of the present invention. FIG. 21 shows how the MAILS-Server Components interconnect the Server's Mail server to the Resource provider (e.g., the University in the example of FIGS. 1-13), which in this case are Servlets used to obtain dynamic content from the application server through the Servlet Plugin 231. Similarly, the FileSystem plugin 232 is used to obtain static content from the file system of the application server. The MAILS-Message Monitor Agent 233 continuously monitors incoming mails in the Server's mailbox 224 and uses the POP/IMAP Adaptor 235 to read the message from the Server's mailbox 224. The message received from the MAILS client is translated using the MAILS-HTTP Translator 234 before sending the translated message to the FileSystem plugin 232 or Servlet Plugin 231 to fetch static or dynamic content. The Servlet Plugin 231 is loaded to handle the incoming request. The session information (session-info) is packaged along with the request as contextual information. The Servlet Plugin 231 waits for the response and the HTTP-MAILS Translator 234 translates the Response Message for use by the MAILS server. The MAILS-Message Generator 236 processes the Response Message translated by the MAILS2HTTP Translator 234. The processed Response Message is dispatched to the Server's Mail server 224 using the SMTP Adaptor 237. Reference numeral 224a represents alternate mechanism through an 'or' configuration between the server's mail server 224 and the MAILS server components represented by other parts of FIG. 21 (vide infra).

Web components, (like Servlets) and application components (like EJB) may be retained in this scheme, thereby protecting customers' investments in developing controller or business logic.

In this example, a difference between HTTP-MAILS translators used in the Server side and in the client side is that the client does not need to deal with HTTP, whereas the server must interface with HTTP, in order to retain controller and business components.

Additional components, such as the Security, Session Management component provide value added service to the MAILS-Server.

The XML Schema of a basic MAILS message (MAILS-ENV) is divided into the following basic parts:

1) MAILS-Headers,
2) Http headers,
3) Mail protocol (i.e. SMTP, POP, IMAP) headers,
4) Message contents.

Since MAILS is used for tunneling, its usage would be very similar to http tunneling and as such, many of the http headers would serve the purpose of MAILS. Moreover, since MAILS uses various mail-related protocols, many of the headers of such protocols form part of MAILS. Those messages, which are not covered by other protocols, are included under MAILS-headers, which ensures that MAILS keeps pace with changes in the various protocol standards.

If MAILS is formulated as a XML document, then the body of MAILS-Messages is sufficient to include type information as well. From and To fields of simple mail would be used to incorporate the sender's and receiver's email id, subject to being used to describe the header type. The body of a mail may be used for messaging purposes. In this way, simple or vanilla email can be used to transmit MAILS-messages as well. The number and type of headers may depend upon the level of sophistication chosen.

Figure 22:
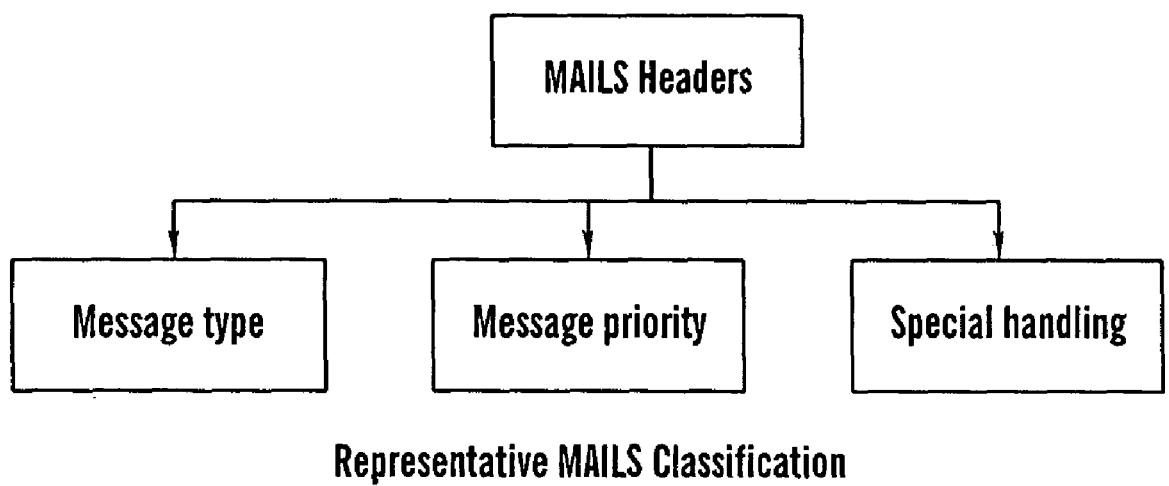
FIG. 22 depicts a representative MAILS classification, in accordance with embodiments of the present invention.

FIG. 22 depicts a representative MAILS classification, in accordance with embodiments of the present invention. In summary, the headers and the message body would constitute a namne-value pair, such that the headers can be used to process the body. In this way, the headers would contain processing instructions or PI that should be recognized by the MAILS-processor. The special handling mentioned supra does not include MIME types, which are supposed to form part of mail headers. If XML format is used, a parser would separate headers from the body; though if the subject field of a normal mail message is used as headers then the overhead of parsing a message could be avoided. Note that "message type" can be error (i.e., the bodies of the message contains a description of some kind of abnormality); normal (i.e., no special meaning has been attributed to the message that is incorporated in the body of the email); instruction (i.e, the body of the e-mail message contains some code or other structure that maybe used by the processor to interpret the message bod); information (i.e., a name in the body of the email message may be used by the processor as the indicator of some state or to process some other information).

FIGS. 23A and 23B (collectively, "FIG. 23") illustrate Extensible Markup Language (XML) schema for MAILS, in accordance with embodiments of the present invention.

MAILS-headers may include any of the following error messages:

a) Browser Not Configured—this is one of the basic error messages. Before using MAILS, the client is configured with access to client's mail-server and is configured with: url of clients mail-server, client's mail id with respect to such mail-server, and client's password to access such mail-server account. If MAILS-enabled client is not on configured with all the necessary information, MAILS-cannot operate. However, alternative cases with dedicated email server for the client (or the server) may not require these steps (also vide infra).
   i) If there is a mismatch between account (email) ID and password, that would be captured and would not come under purview of MAILS-headers.
b) Postman Failed.—if the listener (i.e., the postman) fails to operate at any point of time, then MAILS cannot function.
c) Request Timed Out—depending on how MAILS has been configured on the client, a default interval of time may be taken as a maximum limit for a request to be serviced. On the expiration of such interval of time, the request may be deemed as incapable of being serviced.
d) MAILS Service Not Found On The Server—if the client incorrectly assumes the existence of MAILS, such information may be passed on to the client.
e) Client Port Already Exists—if the server senses a duplicate client port from the same client (i.e., with the same e-mail id), the server would refuse connection.
f) Server Port Already Exists—this could happen when the serverport is not uniquely generated for the client (e.g., more than one server sharing a particular email ID).
g) State Not Found—this is an error message from extended MAILS (i.e., using incremental state for all connections maintained at the server, which is a methodology not an integral part of MAILS but an optional convenience that might be considered even for generalized state machines, which is to send only changes made over the previous state rather than refreshing the whole state. This way, network traffic can be minimized). After an abnormal disconnection, normally a client can get back its state maintained by the server before such disconnection when re-connection takes place immediately thereafter, unless the server fails to reproduce the state of a broken connection.
h) Cannot Verify Identity—if authentication of the client is opted for before a re-connection is allowed after an abnormal break, any failure on part of the client would disallow the client of such privilege.

Figure 24:
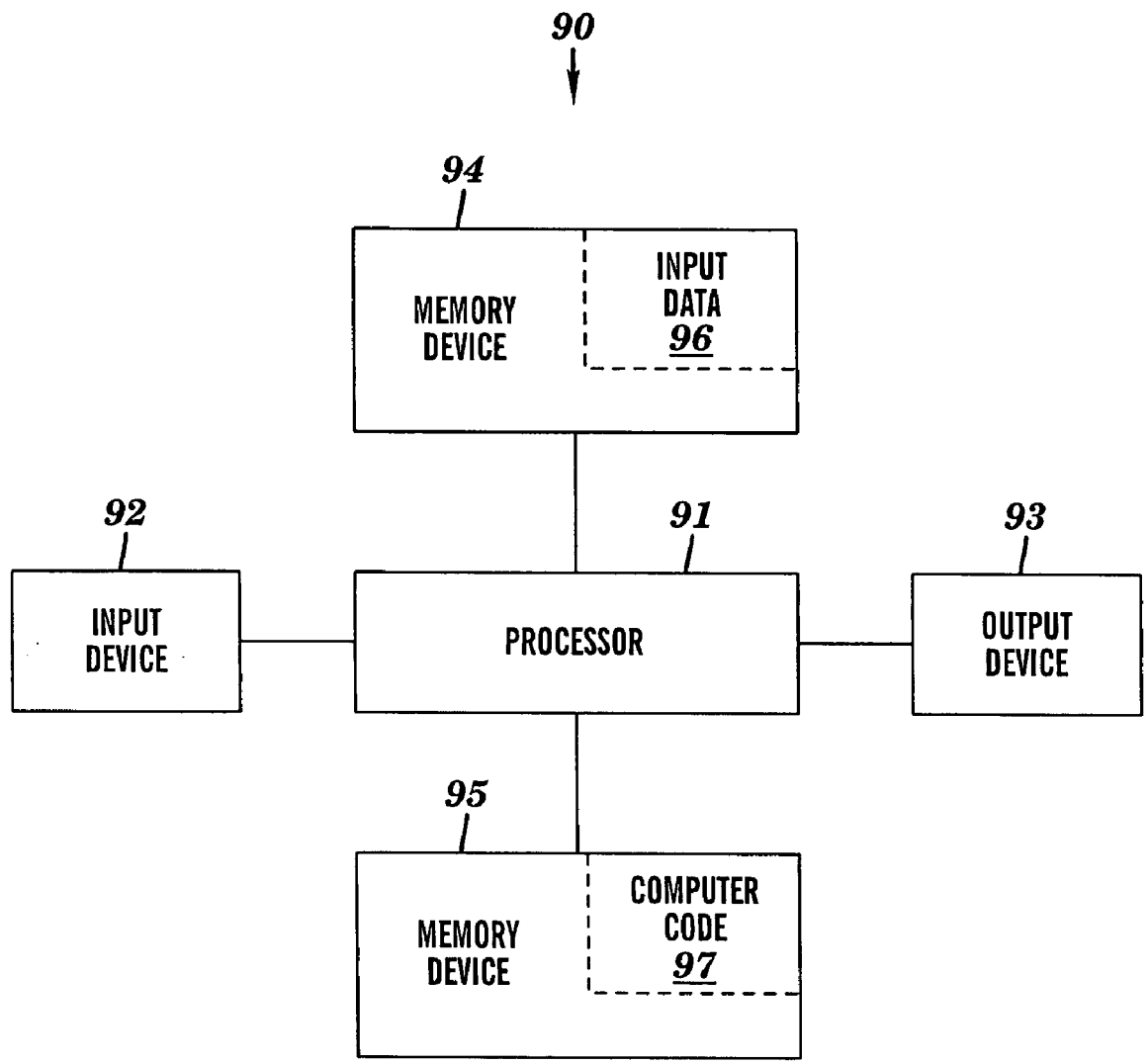
FIG. 24 illustrates a computer system 90 used for implementing mail-based application and document delivery, in accordance with embodiments of the present invention.

FIG. 24 illustrates a computer system 90 used for synchronously transferring information across the Internet, in accordance with embodiments of the present invention. A computer system such as the computer system 90 may comprise the MAILS client (e.g., the MAILS-enabled client 21 of FIG. 2). A computer system such as the computer system 90 may comprise the MAILS server and the application server (e.g., the MAIL Server 26 and the application server 14 of FIG. 2).

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm (e.g., MAILS client, MAILS server, etc.) for synchronously transferring information across the Internet. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 24) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for synchronously transferring information across the Internet.

While FIG. 24 shows the computer system 90 as a particular configuration of hardware and software, any configuration of hardware and software, as would be known to a person of ordinary skill in the art, may be utilized for the purposes stated supra in conjunction with the particular computer system 90 of FIG. 24. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for synchronously transferring information across the Internet, comprising:
   receiving a first message comprising a Universal Resource Locator (URL) address by a MAILS client from a user, said first message being a first electronic mail message, said receiving the first message comprising the URL address by the MAILS client from the user being in response to a determination that a web server is unavailable for accessing the URL address via HyperText Transfer Protocol (HTTP);
   during a session, a microprocessor of a computer system transmitting the first message synchronously across the Internet by electronic mail from the MAILS client to a MAILS server, said MAILS server adapted to synchronously transmit the first message to a software application residing on an application server;
   during the session, receiving by the MAILS client a second message synchronously transmitted across the Internet by electronic mail from the MAILS server, said second message having been synchronously received by the MAILS server from the application in response to the first message, said second message comprising information retrieved at the URL address; and
   transmitting the second message by the MAILS client to the user,
   wherein a communication comprising said transmitting the first message and said receiving the second message is a synchronous communication characterized by said session being blocked during said communication until said communication has been logically completed.

2. The method of claim 1,
   wherein the MAILS client is coupled to an email server of the user such that a MAILS protocol in a MAILS protocol stack for the MAILS client is a synchronous wrapper to an asynchronous email protocol used by the email server of the user to enable the MAILS client to respond synchronously to incoming mail; and
   wherein the MAILS server is coupled to an email server of the application such that a MAILS protocol in a MAILS protocol stack for the MAILS server is a synchronous wrapper to an asynchronous email protocol used by the email server of the application to enable the MAILS server to respond synchronously to incoming mail.

3. The method of claim 2, wherein the asynchronous email protocol used by the email server of the user is Simple Mail Transfer Protocol (SMTP), and wherein the asynchronous email protocol used by the email server of the application is SMTP.

4. The method of claim 3, wherein the MAILS protocol stack for each of the MAILS client and the MAILS server comprises a Transmission Control Protocol (TCP) layer on an Internet Protocol (IP) layer, an SMTP layer on the TCP layer, and a MAILS layer on the SMTP layer, wherein the MAILS layer comprises the synchronous wrapper of the MAILS client and the MAILS server, respectively.

5. The method of claim 2, wherein the email server of the user comprises a mailbox of the user, and wherein the email server of the application comprises a mailbox of the application.

6. The method of claim 5,
   wherein the MAILS client comprises a client translator, a client generator, a client monitoring agent, a client SMTP adapter, a client Post Office Protocol version 3 (POP3) adapter, and a client plugin, wherein the client translator prepares the first message for being sent to the MAILS server using the client SMTP adapter after the first message received from the user has been processed by the client generator, wherein a client POP/IMAP adapter acts as an interface component for the client monitoring agent to enable the client monitoring agent to continuously pull email from the mailbox of the user, and wherein the client plugin interfaces the MAILS client with a browser employed by the user,
   wherein the MAILS server comprises a server translator, a server generator, a server monitoring agent, a server SMTP adapter, a server POP/IMAP adapter, a servlet plugin, and a file system plugin, wherein the server monitoring agent continuously monitors incoming mails in a mailbox of the application comprised by an email server of the application and uses the POP/IMAP adaptor to read the first message from a mailbox of the application, wherein the first message received from the MAILS client is translated using the server translator before sending the translated first message to the file system plugin or to the servlet plugin to respectively fetch the static or dynamic content from the application server, wherein the server translator translates the second message for use by the MAILS server, wherein the server generator processes the second message translated by the server translator, and wherein the processed second message is dispatched to the mailbox of the application using the server SMTP adaptor.

7. The method of claim 1, wherein the second message provides a service to the user by the application.

8. The method of claim 1, wherein said transmitting the first message from the MAILS client to the application does not comprise utilizing a HyperText Transfer Protocol (HTTP) server.

9. The method of claim 1, wherein the application server comprises an Enterprise JavaBeans (EJB) container and a servlet engine, wherein the EJB container is a container for the application, wherein the servlet engine is a container for at least one servlet that is responsible for generating dynamic Hypertext Markup Language (HTML) content by referring to information maintained by the application.

10. A computer program product, comprising a computer readable storage device having a computer readable program code embodied therein, said computer readable program code comprising an algorithm adapted to implement a method for synchronously transferring information across the Internet, said method comprising:
    receiving a first message comprising a Universal Resource Locator (URL) address by a MAILS client from a user, said first message being a first electronic mail message, said receiving the first message comprising the URL address by the MAILS client from the user being in response to a determination that a web server is unavailable for accessing the URL address via HyperText Transfer Protocol (HTTP);
    during a session, transmitting the first message synchronously across the Internet by electronic mail from the MAILS client to a MAILS server, said MAILS server adapted to synchronously transmit the first message to a software application residing on an application server;

during the session, receiving by the MAILS client a second message synchronously transmitted across the Internet by electronic mail from the MAILS server, said second message having been synchronously received by the MAILS server from the application in response to the first message, said second message comprising information retrieved at the URL address; and transmitting the second message by the MAILS client to the user, wherein a communication comprising said transmitting the first message and said receiving the second message is a synchronous communication characterized by said session being blocked during said communication until said communication has been logically completed.

11. The computer program product of claim 10, wherein the MAILS client is coupled to an email server of the user such that a MAILS protocol in a MAILS protocol stack for the MAILS client is a synchronous wrapper to an asynchronous email protocol used by the email server of the user to enable the MAILS client to respond synchronously to incoming mail; and wherein the MAILS server is coupled to an email server of the application such that a MAILS protocol in a MAILS protocol stack for the MAILS server is a synchronous wrapper to an asynchronous email protocol used by the email server of the application to enable the MAILS server to respond synchronously to incoming mail.

12. The computer program product of claim 11, wherein the asynchronous email protocol used by the email server of the user is Simple Mail Transfer Protocol (SMTP), and wherein the asynchronous email protocol used by the email server of the application is SMTP.

13. The computer program product of claim 12, wherein the MAILS protocol stack for each of the MAILS client and the MAILS server comprises a Transmission Control Protocol (TCP) layer on an Internet Protocol (IP) layer, an SMTP layer on the TCP layer, and a MAILS layer on the SMTP layer, wherein the MAILS layer comprises the synchronous wrapper of the MAILS client and the MAILS server, respectively.

14. A system for synchronously transferring information across the Internet, comprising:

a microprocessor;

means for receiving a first message comprising a Universal Resource Locator (URL) address by a MAILS client using the microprocessor from a user, said first message being a first electronic mail message, said receiving the first message comprising the URL address by the MAILS client from the user being in response to a determination that a web server is unavailable for accessing the URL address via HyperText Transfer Protocol (HTTP);

means for transmitting using the microprocessor during a session the first message synchronously across the Internet by electronic mail from the MAILS client to a MAILS server, said MAILS server adapted to synchronously transmit the first message to a software application residing on an application server;

means for receiving by the MAILS client using the microprocessor during the session a second message synchronously transmitted across the Internet by electronic mail from the MAILS server, said second message having been synchronously received by the MAILS server from the application in response to the first message, said second message comprising information retrieved at the URL address; and means for transmitting using the microprocessor the second message by the MAILS client to the user, wherein a communication comprising said transmitting the first message and said receiving the second message is a synchronous communication characterized by said session being blocked during said communication until said communication has been logically completed.

15. The system of claim 14, wherein the MAILS client is coupled to an email server of the user such that a MAILS protocol in a MAILS protocol stack for the MAILS client is a synchronous wrapper to an asynchronous email protocol used by the email server of the user to enable the MAILS client to respond synchronously to incoming mail; and wherein the MAILS server is coupled to an email server of the application such that a MAILS protocol in a MAILS protocol stack for the MAILS server is a synchronous wrapper to an asynchronous email protocol used by the email server of the application to enable the MAILS server to respond synchronously to incoming mail.

16. The system of claim 15, wherein the asynchronous email protocol used by the email server of the user is Simple Mail Transfer Protocol (SMTP), and wherein the asynchronous email protocol used by the email server of the application is SMTP.

17. The system of claim 16, wherein the MAILS protocol stack for each of the MAILS client and the MAILS server comprises a Transmission Control Protocol (TCP) layer on an Internet Protocol (IP) layer, an SMTP layer on the TCP layer, and a MAILS layer on the SMTP layer, wherein the MAILS layer comprises the synchronous wrapper of the MAILS client and the MAILS server, respectively.

18. A method for synchronously transferring information across the Internet, comprising:

during a session, a microprocessor of a computer system receiving by a MAILS server a first message synchronously transmitted across the Internet by electronic mail from a MAILS client, said first message having been previously received by the MAILS client from a user, said first message being a first electronic mail message and comprising a Universal Resource Locator (URL) address, said first message having been previously received by the MAILS client from the user in response to a determination that a web server is unavailable for accessing the URL address via HyperText Transfer Protocol (HTTP); and during the session, transmitting the first message synchronously from the MAILS server to a software application residing on an application server;

during the session, receiving by the MAILS server a second message synchronously transmitted from the application in response to the first message, said second message comprising information retrieved at the URL address; and during the session, transmitting the second message synchronously across the Internet by electronic mail from the MAILS server to the MAILS client, said MAILS server adapted to transmit the second message to the user, wherein a communication comprising said receiving the first message, said transmitting the first message, said receiving the second message, and said transmitting the second message is a synchronous communication characterized by said session being blocked during said communication until said communication has been logically completed.

19. The method of claim 18,
wherein the MAILS client is coupled to an email server of the user such that a MAILS protocol in a MAILS protocol stack for the MAILS client is a synchronous wrapper to an asynchronous email protocol used by the email server of the user to enable the MAILS client to respond synchronously to incoming mail; and
wherein the MAILS server is coupled to an email server of the application such that a MAILS protocol in a MAILS protocol stack for the MAILS server is a synchronous wrapper to an asynchronous email protocol used by the email server of the application to enable the MAILS server to respond synchronously to incoming mail.

20. The method of claim 19, wherein the asynchronous email protocol used by the email server of the user is Simple Mail Transfer Protocol (SMTP), and wherein the asynchronous email protocol used by the email server of the application is SMTP.

21. The method of claim 20, wherein the MAILS protocol stack for each of the MAILS client and the MAILS server comprises a Transmission Control Protocol (TCP) layer on an Internet Protocol (IP) layer, an SMTP layer on the TCP layer, and a MAILS layer on the SMTP layer, wherein the MAILS layer comprises the synchronous wrapper of the MAILS client and the MAILS server, respectively.

22. The method of claim 19, wherein the email server of the user comprises a mailbox of the user, and wherein the email server of the application comprises a mailbox of the application.

23. The method of claim 22,
wherein the MAILS client comprises a client translator, a client generator, a client monitoring agent, a client SMTP adapter, a client Post Office Protocol version 3 (POP3) adapter, and a client plugin, wherein the client translator prepares the first message for being sent to the MAILS server using the client SMTP adapter after the first message received from the user has been processed by the client generator, wherein a client POP3 adapter acts as an interface component for the client monitoring agent to enable the client monitoring agent to continuously pull email from the mailbox of the user, and wherein the client plugin interfaces the MAILS client with a browser employed by the user
wherein the MAILS server comprises a server translator, a server generator, a server monitoring agent, a server SMTP adapter, a server POP/IMAP adapter, a servlet plugin, and a file system plugin, wherein the server monitoring agent continuously monitors incoming mails in a mailbox of the application comprised by an email server of the application and uses the POP/IMAP adaptor to read the first message from a mailbox of the application, wherein the first message received from the MAILS client is translated using the server translator before sending the translated first message to the file system plugin or to the servlet engine plugin to respectively fetch the static or dynamic content from the application server, wherein the server translator translates the second message for use by the MAILS server, wherein the server generator processes the second message translated by the server translator, and wherein the processed second message is dispatched to the mailbox of the application using the server SMTP adaptor.

24. The method of claim 18, wherein the second message provides a service by the application to the user.

25. The method of claim 18, wherein said receiving by the MAILS server the first message synchronously transmitted across the Internet by electronic mail from the MAILS client does not utilizing a HyperText Transfer Protocol (HTTP) server.

26. The method of claim 18, wherein the application server comprises an Enterprise JavaBeans (EJB) container and a servlet engine, wherein the EJB container is a container for the application, wherein the servlet engine is a container for at least one servlet that is responsible for generating dynamic Hypertext Markup Language (HTML) content by referring to information maintained by the application.

27. A computer program product, comprising a computer readable storage device having a computer readable program code embodied therein, said computer readable program code comprising an algorithm adapted to implement a method for synchronously transferring information across the Internet, said method comprising:
during a session, receiving by a MAILS server a first message synchronously transmitted across the Internet by electronic mail from a MAILS client, said first message having been previously received by the MAILS client from a user, said first message being a first electronic mail message and comprising a Universal Resource Locator (URL) address, said first message having been previously received by the MAILS client from the user in response to a determination that a web server is unavailable for accessing the URL address via HyperText Transfer Protocol (HTTP);
during the session, transmitting the first message synchronously from the MAILS server to a software application residing on an application server;
during the session, receiving by the MAILS server a second message synchronously transmitted from the application in response to the first message, said second message comprising information retrieved at the URL address; and
during the session, transmitting the second message synchronously across the Internet by electronic mail from the MAILS server to the MAILS client, said MAILS server adapted to transmit the second message to the user,
wherein a communication comprising said receiving the first message, said transmitting the first message, said receiving the second message, and said transmitting the second message is a synchronous communication characterized by said session being blocked during said communication until said communication has been logically completed.

28. The computer program product of claim 27,
wherein the MAILS client is coupled to an email server of the user such that a MAILS protocol in a MAILS protocol stack for the MAILS client is a synchronous wrapper to an asynchronous email protocol used by the email server of the user to enable the MAILS client to respond synchronously to incoming mail; and
wherein the MAILS server is coupled to an email server of the application such that a MAILS protocol in a MAILS protocol stack for the MAILS server is a synchronous wrapper to an asynchronous email protocol used by the email server of the application to enable the MAILS server to respond synchronously to incoming mail.

29. The computer program product of claim 28, wherein the asynchronous email protocol used by the email server of the user is Simple Mail Transfer Protocol (SMTP), and wherein the asynchronous email protocol used by the email server of the application is SMTP.

30. The computer program product of claim 29, wherein the MAILS protocol stack for each of the MAILS client and the MAILS server comprises a Transmission Control Protocol (TCP) layer on an Internet Protocol (IP) layer, an SMTP layer on the TCP layer, and a MAILS layer on the SMTP layer, wherein the MAILS layer comprises the synchronous wrapper of the MAILS client and the MAILS server, respectively.

31. A system for synchronously transferring information across the Internet, comprising:
  a microprocessor;
  means for receiving by a MAILS server using the microprocessor during a session a first message synchronously transmitted across the Internet by electronic mail from a MAILS client, said first message having been previously received by the MAILS client from a user, said first message being a first electronic mail message and comprising a Universal Resource Locator (URL) address, said first message having been previously received by the MAILS client from the user in response to a determination that a web server is unavailable for accessing the URL address via HyperText Transfer Protocol (HTTP); and
  means for transmitting using the microprocessor during the session the first message synchronously from the MAILS server to a software application residing on an application server;
  means for receiving by the MAILS server using the microprocessor during the session a second message synchronously transmitted from the application in response to the first message, said second message comprising information retrieved at the URL address; and
  means for transmitting using the microprocessor during the session the second message synchronously across the Internet by electronic mail from the MAILS server to the MAILS client, said MAILS server adapted to transmit the second message to the user;
  wherein a communication comprising said receiving the first message, said transmitting the first message, said receiving the second message, and said transmitting the second message is a synchronous communication characterized by said session being blocked during said communication until said communication has been logically completed.

32. The system of claim 31,
  wherein the MAILS client is coupled to an email server of the user such that a MAILS protocol in a MAILS protocol stack for the MAILS client is a synchronous wrapper to an asynchronous email protocol used by the email server of the user to enable the MAILS client to respond synchronously to incoming mail; and
  wherein the MAILS server is coupled to an email server of the application such that a MAILS protocol in a MAILS protocol stack for the MAILS server is a synchronous wrapper to an asynchronous email protocol used by the email server of the application to enable the MAILS server to respond synchronously to incoming mail.

33. The system of claim 32, wherein the asynchronous email protocol used by the email server of the user is Simple Mail Transfer Protocol (SMTP), and wherein the asynchronous email protocol used by the email server of the application is SMTP.

34. The system of claim 33, wherein the MAILS protocol stack for each of the MAILS client and the MAILS server comprises a Transmission Control Protocol (TCP) layer on an Internet Protocol (IP) layer, an SMTP layer on the TCP layer, and a MAILS layer on the SMTP layer, wherein the MAILS layer comprises the synchronous wrapper of the MAILS client and the MAILS server, respectively.

* * * * *